(12) United States Patent
Wang et al.

(10) Patent No.: US 10,812,245 B2
(45) Date of Patent: **\*Oct. 20, 2020**

(54) METHOD FOR TRANSMITTING UPLINK CONTROL INFORMATION, UE AND BASE STATION

(71) Applicant: FUJITSU LIMITED, Kawasaki-shi, Kanagawa (JP)

(72) Inventors: Yi Wang, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,199

(22) Filed: Feb. 14, 2019

(65) Prior Publication Data

US 2019/0182014 A1 Jun. 13, 2019

Related U.S. Application Data

(63) Continuation of application No. 14/929,960, filed on Nov. 2, 2015, which is a continuation of application
(Continued)

(51) Int. Cl.
*H04L 5/00* (2006.01)
*H04L 1/16* (2006.01)
*H04L 1/18* (2006.01)

(52) U.S. Cl.
CPC .......... *H04L 5/0058* (2013.01); *H04L 1/1671* (2013.01); *H04L 1/1861* (2013.01);
(Continued)

(58) Field of Classification Search
None
See application file for complete search history.

(56) References Cited

U.S. PATENT DOCUMENTS 8,422,439 B2 4/2013 Nimbalker et al.
9,496,995 B2 * 11/2016 Kim .................. H04L 5/001
(Continued)

FOREIGN PATENT DOCUMENTS

| CN | 102111886 A | 6/2011 |
|----|-------------|--------|
| CN | 102474376 A | 5/2012 |

(Continued)

OTHER PUBLICATIONS

Non-Final Office Action issued by the United States Patent and Trademark Office for corresponding U.S. Appl. No. 14/929,960, electronically delivered on Oct. 16, 2017.
(Continued)

*Primary Examiner* — Michael J Moore, Jr.
*Assistant Examiner* — Gautam Sharma
(74) *Attorney, Agent, or Firm* — Myers Wolin, LLC.

(57) ABSTRACT

A communication apparatus, including: a controller configured to control to map an uplink control information (UCI) onto a radio resource wherein one time-domain symbol of a subframe where the UCI is located carries an uplink reference signal; and a transmitter configured to transmit the UCI via a Physical Channel, wherein, the controller control to map a first UCI onto Orthogonal Frequency Division Multiplexing (OFDM) symbols, in a mapping manner of time domain first, and wherein, when the sub-frame where the UCI is located contains one uplink reference signal, the OFDM symbols are close to the uplink reference signal.

17 Claims, 15 Drawing Sheets

Related U.S. Application Data

No. PCT/CN2013/075403, filed on May 9, 2013, now Pat. No. 10,256,964.

(52) U.S. Cl.
CPC .......... *H04L 5/0007* (2013.01); *H04L 5/0048* (2013.01); *H04L 5/0055* (2013.01)

(56) References Cited

U.S. PATENT DOCUMENTS

| | | | | |
|---|---|---|---|---|
| 2009/0207784 | A1* | 8/2009 | Lee | H04B 7/063 370/328 |
| 2011/0013615 | A1 | 1/2011 | Lee et al. | |
| 2011/0194523 | A1 | 8/2011 | Chung et al. | |
| 2011/0310823 | A1 | 12/2011 | Nam et al. | |
| 2011/0310855 | A1 | 12/2011 | Yin et al. | |
| 2014/0029428 | A1* | 1/2014 | Lin | H04L 5/0048 370/235 |
| 2015/0201406 | A1* | 7/2015 | Zhang | H04L 5/0055 370/330 |

FOREIGN PATENT DOCUMENTS

| | | |
|---|---|---|
| CN | 102685890 A | 9/2012 |
| KR | 10-2011-0009025 A | 1/2011 |
| WO | 2010/148319 A1 | 12/2010 |
| WO | 2011/019795 A1 | 2/2011 |
| WO | 2011/158968 A1 | 12/2011 |

OTHER PUBLICATIONS

Final Office Action issued by the United States Patent and Trademark Office for corresponding U.S. Appl. No. 14/929,960, electronically delivered on Jun. 14, 2018.

International Search Report issued for corresponding International Patent Application No. PCT/CN2013/075403, dated Feb. 20, 2014, with an English translation.

Written Opinion of the International Searching Authority for corresponding International Patent Application No. PCT/CN2013/075403 dated Feb. 20, 2014, with English translation.

Extended European search report with supplementary European search report and the European search opinion issued by the European Patent Office for corresponding European Patent Application No. 13884340.4, dated Nov. 30, 2016.

Notice of Preliminary Rejection issued by the Korean Intellectual Property Office for corresponding Korean Patent Application No. 10-2015-7033558, dated Feb. 17, 2017, with English translation.

Notification of Reasons for Refusal issued for corresponding Japanese Patent Application No. 2016-512186 dated Apr. 25, 2017 with an English translation.

Notification of Reasons for Refusal issued for corresponding Japanese Patent Application No. 2016-512186 dated Oct. 31, 2017, with an English translation.

Alcatel-Lucent Shanghai Bell et al., "Discussion of DMRS overhead reduction for small cells", Agenda Item: 7.2.5.2.1, 3GPP TSG-RAN WG1 Meeting #72bis, R1-1301634, Chicago, U.S.A., Apr. 15-19, 2013.

First Notification of Office Action issued by the State Intellectual Property Office of China for corresponding Chinese Patent Application No. 201380075948.7, dated Feb. 24, 2018, with an English translation.

Search Report issued by the State Intellectual Property Office of China for corresponding Chinese Patent Application No. 201380075948.7, dated Feb. 24, 2018, with an English translation.

* cited by examiner

301

UE maps UCI onto time-frequency resources, wherein a subframe where the UCI is located contains one uplink reference signal or contains no an uplink reference signal

302

The UE transmits the UCI to a base station via a PUSCH

METHOD FOR TRANSMITTING UPLINK CONTROL INFORMATION, UE AND BASE STATION

CROSS REFERENCE TO RELATED APPLICATIONS

This application is a continuation application of U.S. application Ser. No. 14/929,960, filed Nov. 2, 2015, which is a continuation application of International Application PCT/CN2013/075403 filed on May 9, 2013, the entire contents of each are incorporated herein by reference.

TECHNICAL FIELD

The present disclosure relates to the field of communications, and in particular to a method for transmitting uplink control information, UE and a base station.

BACKGROUND

In an existing E-UTRA (evolved UMTS terrestrial radio access) system, an OFDM (orthogonal frequency division multiplexing) technology is used in a downlink, and an SC-OFDM (single-carrier orthogonal frequency division multiplexing) technology is used in an uplink. In uplink transmission, a user may transmit uplink control information (UCI). The UCI may include ACK/NACK feedback information in a hybrid repeat mechanism, rank indication (RI) information related to a channel state, channel quality information (CQI), and precoding matrix information (PMI).

The UCI may be transmitted periodically, and may also be transmitted aperiodically, such as transmission based on triggering. The UCI may be transmitted via a physical uplink control channel (PUCCH), and may also be transmitted via a physical uplink shared channel (PUSCH). When the UCI is transmitted via the PUSCH, it may be multiplexed with uplink data, and also be transmitted separately without uplink data.

In an existing system, when the UCI is transmitted in the PUSCH, each time slot of each subframe has OFDM symbol(s) for transmitting the UCI, and the UCI is mapped onto time-frequency resources in a mapping manner of time domain first. For example, ACK/NACK control information is mapped into four OFDM symbols neighboring uplink reference signals (RSs), and RI information is mapped into four OFDM symbols neighboring the OFDM symbols occupied by the ACK/NACK, with both types of the UCI being mapped from bottoms of frequency band resources occupied by a PUSCH to tops. CQI/PMI occupies all OFDM symbols in the time domain, and is mapped from the tops of the frequency band resources occupied by the PUSCH to the bottoms, which are followed by uplink data. Rate matching is performed on the uplink data according the RI information and the CQI/PMI, while the ACK/NACK is mapped into the PUSCH by puncturing uplink data at corresponding positions.

As great increase of smart terminals, in further evolvement of a future LTE-advanced system, it is possible that a legacy macro base station (Macro cell) is unable to deal with such rapidly increased demands for capacities and peak value rates. Users may be made to be more close to a base station by deploying base stations more densely, thereby improving system capacities, increasing peak value rates and improving user terminal experiences. However, deployment of high-power macro base stations will result in problems of over high cost, and non-green communication, etc. Hence, people are starting to consider a small base station (small cell) of low power (such as a pico cell, a Femto cell, and a remote radio head (RRH)). In comparison with a macro base station, a small base station is advantageous in low cost, fast and flexible deployment and high cost performance. Thus, small base stations are applicable to outdoor hot spots, increase network capacities, improve indoor deep coverage, and increase user perception.

Therefore, small base stations are drawing more and more attention of the industry. In a future LTE-Advanced network, the number of small base stations will exceed that of legacy macro base stations. Coverage of a small base station is smaller than that of a macro base station, and may use a higher available frequency band, such as 3.5 GHz; while a macro base station follows to use an existing relatively low frequency band, so as to provide relatively large and robust coverage.

However, it was found by the inventors that typical serving objects of a small base station are low-speed moving or stationary users with relatively small multi-path delay expansion. Hence, when a user is served by a small base station, a change of its channel is slow, which may be deemed as being relatively flat in the time dimension or the frequency domain dimension. And in an existing system, an uplink reference signal still occupies two OFDM/SC-FDMA symbols in a subframe, which results in waste of resources, and is disadvantageous to further improving performance of the system.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Embodiments of the present disclosure provide a method for transmitting UCI, UE and a base station, with an object being to obtain better decoding performance while reducing resources occupied by an uplink reference signal and lowering waste of resources.

According to an aspect of the embodiments of the present disclosure, there is provided a method for transmitting UCI, including:

mapping, by UE, UCI onto time-frequency resources, wherein a subframe where the UCI is located contains one uplink reference signal or contains no an uplink reference signal; and transmitting the UCI to a base station via a PUSCH.

According to another aspect of the embodiments of the present disclosure, there is provided a method for transmitting UCI, including:

receiving, by a base station, UCI transmitted by UE via a PUSCH, wherein a subframe where the UCI is located contains one uplink reference signal or contains no an uplink reference signal; and demodulating the PUSCH to obtain the UCI.

According to still another aspect of the embodiments of the present disclosure, there is provided UE, including:

a mapping unit configured to map UCI onto time-frequency resources; wherein a subframe where the UCI is located contains one uplink reference signal or contains no an uplink reference signal; and a transmitting unit configured to transmit the UCI to a base station via a PUSCH.

According to still another aspect of the embodiments of the present disclosure, there is provided a base station, including:

a receiving unit configured to receiving UCI transmitted by UE via a PUSCH; wherein a subframe where the UCI is located contains one uplink reference signal or contains no an uplink reference signal; and a demodulating unit configured to demodulate the PUSCH to obtain the UCI.

According to still another aspect of the embodiments of the present disclosure, there is provided a communication system, including the UE and the base station as described above.

According to still another aspect of the embodiments of the present disclosure, there is provided a computer-readable program, wherein when the program is executed in UE, the program enables a computer to carry out the method for transmitting UCI as described above in the UE.

According to still another aspect of the embodiments of the present disclosure, there is provided a storage medium in which a computer-readable program is stored, wherein the computer-readable program enables a computer to carry out the method for transmitting UCI as described above in UE.

According to still another aspect of the embodiments of the present disclosure, there is provided a computer-readable program, wherein when the program is executed in a base station, the program enables a computer to carry out the method for transmitting UCI as described above in the base station.

According to still another aspect of the embodiments of the present disclosure, there is provided a storage medium in which a computer-readable program is stored, wherein the computer-readable program enables a computer to carry out the method for transmitting UCI as described above in a base station.

An advantage of the embodiments of the present disclosure exists in that waste of resources may be reduced by occupying only one or not occupying an OFDM/SC-FDMA symbol in a subframe by an uplink reference signal; and UCI is made to be transmitted in a PUSCH by correspondingly changing resource mapping of the UCI, thereby obtaining better decoding performance.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Figure 1:
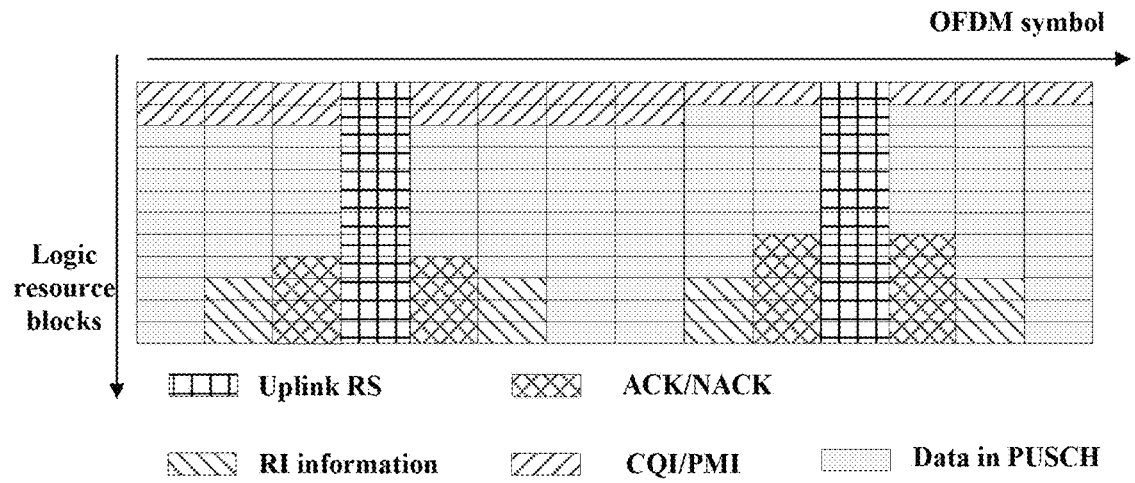
FIG. 1 is a schematic diagram of a manner of multiplexing UCI and a PUSCH within an allocated uplink bandwidth in the relevant art.
Figure 2:
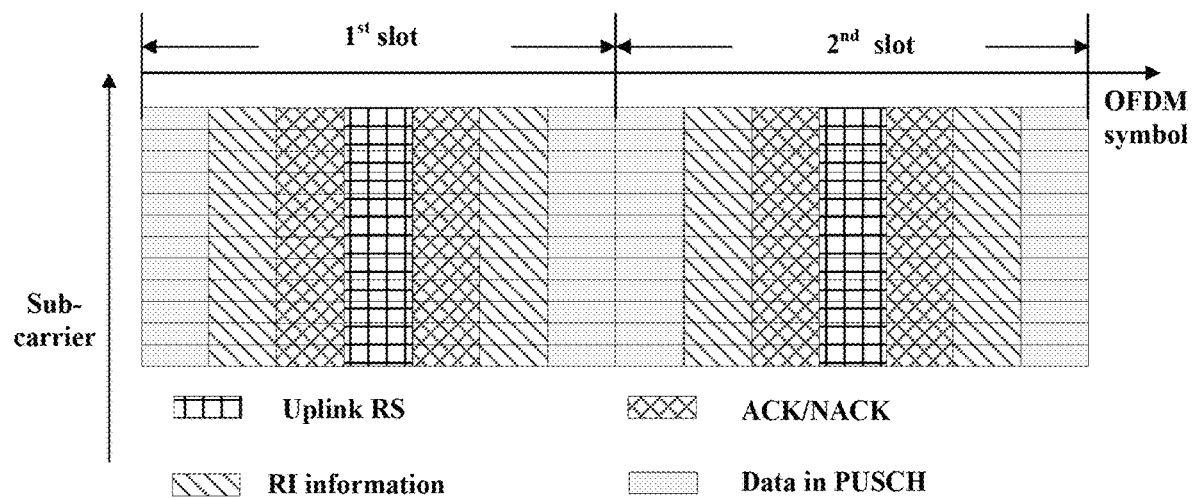
FIG. 2 is a schematic diagram of a manner of multiplexing UCI and a PUSCH within a logic resource block pair in the relevant art.

FIG. 1 is a schematic diagram of a manner of multiplexing UCI and a PUSCH within an allocated uplink bandwidth in the relevant art, and FIG. 2 is a schematic diagram of a manner of multiplexing UCI and a PUSCH within a logic resource block pair (RB pair) in the relevant art. As shown in FIGS. 1 and 2, in each of two time slots of a subframe, an uplink reference signal (which may also be referred to as a pilot signal) occupies an OFDM symbol, thereby resulting in waste of resources.

In the embodiments of the present disclosure, a density of the pilot signals may be lowered; for example, in the time domain, the number of uplink pilot signals may be lowered from one per time slot into one per subframe, that is, one pilot signal of a time slot in each subframe is removed; or there may be no uplink pilot signal in a subframe. Furthermore, when the UCI and PUSCH are transmitted in a multiplexed manner, mapping is performed in a manner most close to an uplink pilot signal. If design of the uplink pilot signals changes, corresponding UCI should also change. Embodiments of the present disclosure shall be described below in detail.

Embodiment 1

Figures 3, 4:
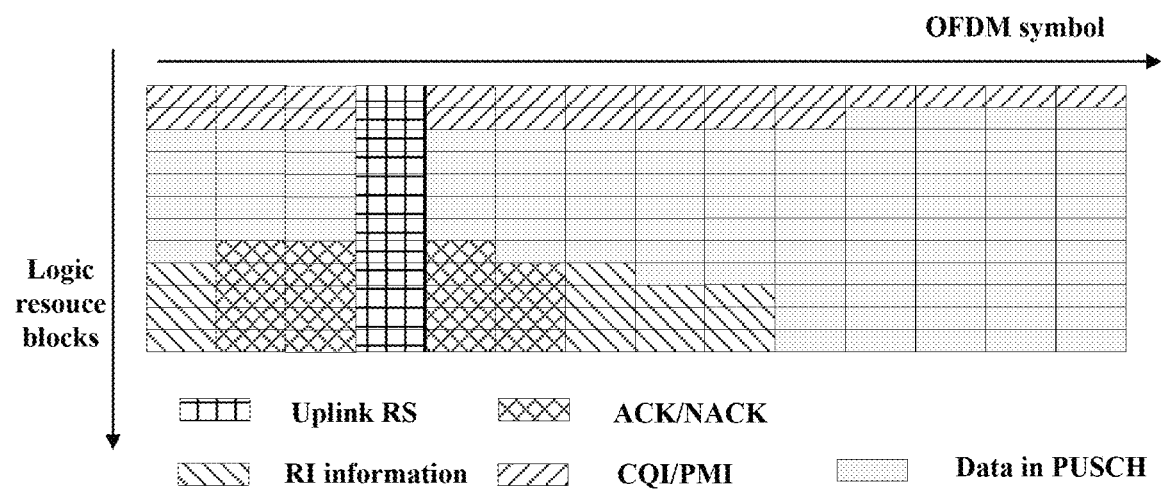
FIG. 3 is a flowchart of the method for transmitting UCI of an embodiment of the present disclosure.
FIG. 4 is a schematic diagram of multiplexing UCI and a PUSCH within an uplink bandwidth of an embodiment of the present disclosure.

An embodiment of the present disclosure provides a method for transmitting UCI, which shall be described from a UE side. FIG. 3 is a flowchart of the method for transmitting UCI of the embodiment of the present disclosure. As shown in FIG. 3, the method includes:

step 301: UE maps UCI onto time-frequency resources, wherein a subframe where the UCI is located contains one uplink reference signal or contains no an uplink reference signal; and step 302: the UE transmits the UCI to a base station via a PUSCH.

In this embodiment, the uplink reference signal may be a demodulation reference signal (DMRS) or a sounding reference signal (SRS), and also be other reference signals; the present disclosure is not limited thereto, and a particular uplink reference signal may be determined according to an actual situation.

In this embodiment, different from the relevant art, the uplink reference signal may occupy only one OFDM symbol in a subframe, and may occupy an OFDM symbol of one of two time slots of the subframe, such as a fourth OFDM symbol of a first time slot. However, the present disclosure is not limited thereto; for example, it may also be any one of 14 OFDM symbols of a subframe. Or, there may be no an uplink reference signal in a subframe transmitting UCI, while uplink reference signal(s) is/are contained in other subframes close to this subframe. Furthermore, an uplink reference signal is not limited to consecutively occupying all subcarriers in one or more resource blocks, and may occupy only a part of them.

Hence, occupying only one OFDM symbol or occupying no an OFDM symbol in a subframe by an uplink reference signal is applicable to a scenario where a channel changes slowly when UE is served by a base station, such as a small base station used in a hot spot or a small base station used in a family, thereby lowering waste of resources. Furthermore, as the uplink reference signal changes, resource mapping of the UCI needs also to change. The mapping of the UCI (including ACK/NACK, RI, and CQI/PMI, etc.) shall be described below in detail.

It should be noted that the present disclosure is not limited to ACK/NACK, RI, or CQI/PMI, and it is also applicable to other UCI. The ACK/NACK below in this embodiment represents a first type UCI having a highest requirement on performance, and its requirement on channel estimation performance is most strict; RI represents a second type of UCI, and its requirement on performance is weaker than that of the first type; and CQI/PMI represents a third type of UCI, and its requirement on performance is weakest. Furthermore, the present disclosure is not limited to three types; for example, it may also be two types or four types, and a particular implementation may be determined according to an actual situation.

In an implementation, the subframe where the UCI is present contains one uplink reference signal, and the mapping the UCI onto time-frequency resources by UE includes: mapping ACK/NACK feedback information in a hybrid repeat mechanism onto an OFDM symbol close to the uplink reference signal, and mapping RI information onto an OFDM symbol close to the ACK/NACK feedback information. And a manner of mapping the CQI/PMI is identical to that of an existing system, that is, occupying all OFDM symbols of a subframe in the time domain, and mapping from tops of frequency band resources occupied by the PUSCH to the bottoms; and uplink data may follow immediately. The step of multiplexing the data carried by the PUSCH and the UCI may be carried out by channel interleaving, and the channel interleaving part transmitting UCI in a PUSCH in TS 36.212 may be referred to.

In particular, the ACK/NACK information and the RI information may be mapped following a principle of being close to an uplink reference signal as possible; for example, a priority of the ACK/NACK information is higher, that is, it is ensured that the ACK/NACK information is more close to the uplink reference signal, and the RI information is mapped on an OFDM symbol close to the OFDM symbol occupied by the ACK/NACK information. All the UCI is mapped in an order of time domain first, that is, it is mapped onto the PUSCH in a manner of mapping along serial numbers of the OFDM symbols first and then along serial number of subcarriers. For example, the ACK/NACK information occupies at most M OFDM symbols, and the RI information occupies at most N OFDM symbols, M and N being predefined by the system; for example, M=N=4. These two types of UCI are mapped from a bottom of a PUSCH bandwidth to a top, that is, they are mapped from a resource block of a highest serial number to resource blocks of low serial numbers. However, M and N are not limited thereto, and may be determined according to an actual situation.

Figure 5:
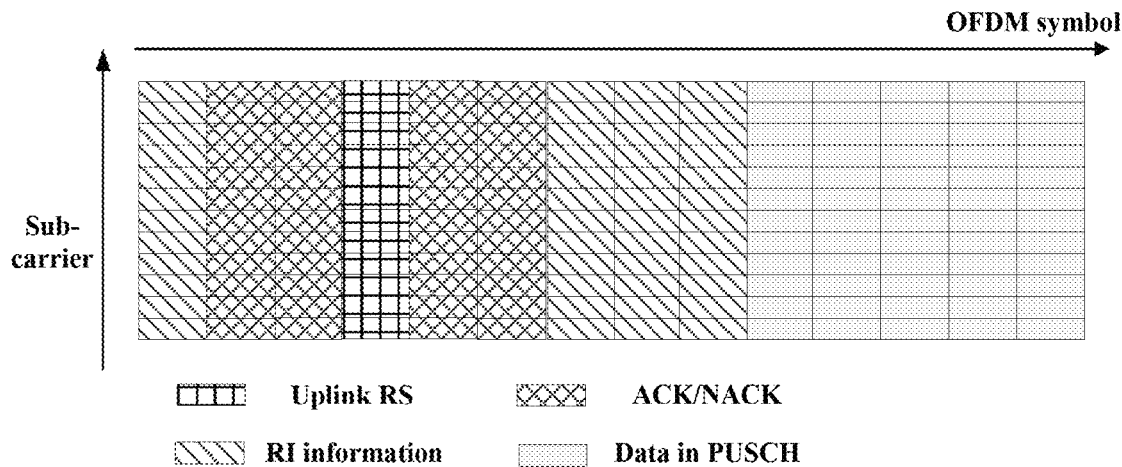
FIG. 5 is a schematic diagram of multiplexing UCI and a PUSCH within a logic resource block pair of an embodiment of the present disclosure.

FIG. 4 is a schematic diagram of multiplexing UCI and a PUSCH within an uplink bandwidth of an embodiment of the present disclosure, and FIG. 5 is a schematic diagram of multiplexing UCI and a PUSCH within a logic resource block pair of an embodiment of the present disclosure. As shown in FIGS. 4 and 5, the uplink reference signal exists only in a time slot, and is located at a fourth OFDM symbol of a first time slot.

ACK/NACK information is mapped onto OFDM symbols in proximity to the OFDM symbol of the uplink reference signal. In this embodiment, both the ACK/NACK information and RI information occupy four OFDM symbols, respectively, that is, M=N=4. For example, the ACK/NACK information is mapped onto a second, third, fifth and sixth OFDM symbols of the first time slot, the RI information is located on the OFDM symbols in proximity to the OFDM symbols occupied by the ACK/NACK, and in this example, is mapped on to a first and seventh OFDM symbols of the first time slot and a first and second OFDM symbols of a second time slot.

As shown in FIG. 4, these two types of UCI are mapped according to a rule of time domain first. For example, the ACK/NACK information is mapped onto four OFDM symbols, in which all the former three OFDM symbols are mapped with four RBs, and the last OFDM symbol is mapped with only three RBs. In this example, it is assumed that a PUSCH is allocated with 12 RB pairs. Both the ACK/NACK information and the RI information are mapped to an eleventh, tenth and ninth RBs starting from a twelfth RB of the PUSCH. And a manner of mapping the CQI/PMI is identical to that of an existing system, that is, all 14 OFDM symbols of a subframe are occupied in the time domain, and mapping is performed starting from a first RB of the PUSCH to RBs of larger serial numbers, which may be followed by uplink data.

In another implementation, the subframe where the UCI is located contains one uplink reference signal, and the mapping the UCI onto time-frequency resources by UE includes: mapping the ACK/NACK information onto OFDM symbols close to the uplink reference signal, and mapping the RI information onto OFDM symbols close to the ACK/NACK feedback information, in a mapping manner of time domain first.

In this implementation, the mapping the UCI onto time-frequency resources by UE further includes: mapping the CQI or the PMI onto OFDM symbols of a time slot where the uplink reference signal is located; or mapping the CQI or the PMI onto K OFDM symbols close to the uplink reference signal; where, K is greater than or equal to 1, and is less than the number of OFDM symbols contained in one subframe. If there are resources in the K OFDM symbols occupied by other control information or reference signals or data, the mapping may be performed directly, or may be performed in a manner of punching or rate matching.

In particular, the ACK/NACK information, RI information and CQI/PMI information may all be mapped following a principle of being close to an uplink reference signal as possible; for example, a priority of the ACK/NACK control information is higher, that is, it is ensured that the ACK/NACK information is more close to the uplink reference signal, and the RI information is mapped on an OFDM symbol in close proximity to the OFDM symbols occupied by the ACK/NACK information. All the UCI is mapped in an order of time domain first, that is, it is mapped onto the PUSCH in a manner of mapping along serial numbers of the OFDM symbols first and then along serial numbers of subcarriers. For example, the ACK/NACK information occupies at most M OFDM symbols, and the RI information occupies at most N OFDM symbols. These two types of UCI are mapped from a bottom of a PUSCH bandwidth to a top. While the CQI/PMI information is only mapped within a time slot containing an uplink reference signal (such as the first time slot), or is mapped within a distance of k OFDM symbols from the uplink reference signal. The CQI/PMI information is mapped from the top of the PUSCH bandwidth to the bottom, which may be followed by uplink data.

Figure 6:
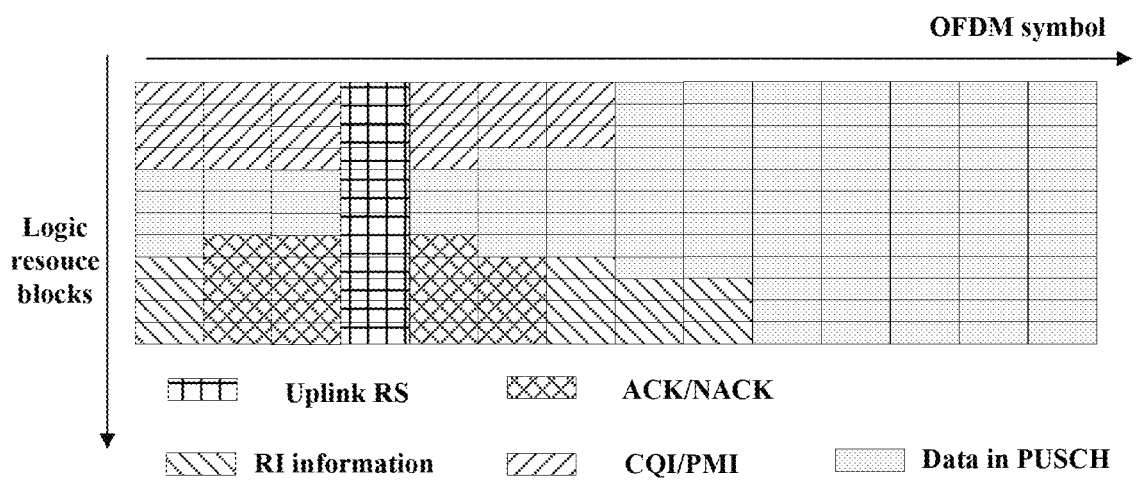
FIG. 6 is another schematic diagram of multiplexing UCI and a PUSCH within an uplink bandwidth of an embodiment of the present disclosure.

FIG. 6 is another schematic diagram of multiplexing UCI and a PUSCH within an uplink bandwidth of an embodiment of the present disclosure. As shown in FIG. 6, in comparison with the implementation shown in FIG. 4, a manner of mapping the CQI/PMI information in this implementation is different. As shown in FIG. 6, it is still assumed that the uplink reference signal exists in a time slot, and is located in the fourth OFDM symbol of the first time slot. Then, the CQI/PMI information is mapped only in the first time slot following the principle of time domain first, and is mapped starting from the first RB of the PUSCH to RBs of larger serial numbers, which may be followed by uplink data.

It should be noted that a case where the uplink reference signal occupies the fourth OFDM symbol of the first time slot is only shown in FIGS. 4 and 6; however, the present disclosure is not limited thereto, and other OFDM symbols may also be occupied. Furthermore, FIG. 6 shows only an example of mapping the CQI/PMI information on 6 OFDM symbols of the first time slot. However, the present disclosure is not limited thereto; for example, it may also be mapped on two OFDM symbols close to the uplink reference signal (that is, k=2, the third and fifth OFDM symbols in FIG. 6), and a particular implementation may be determined according to an actual situation.

Figure 7:
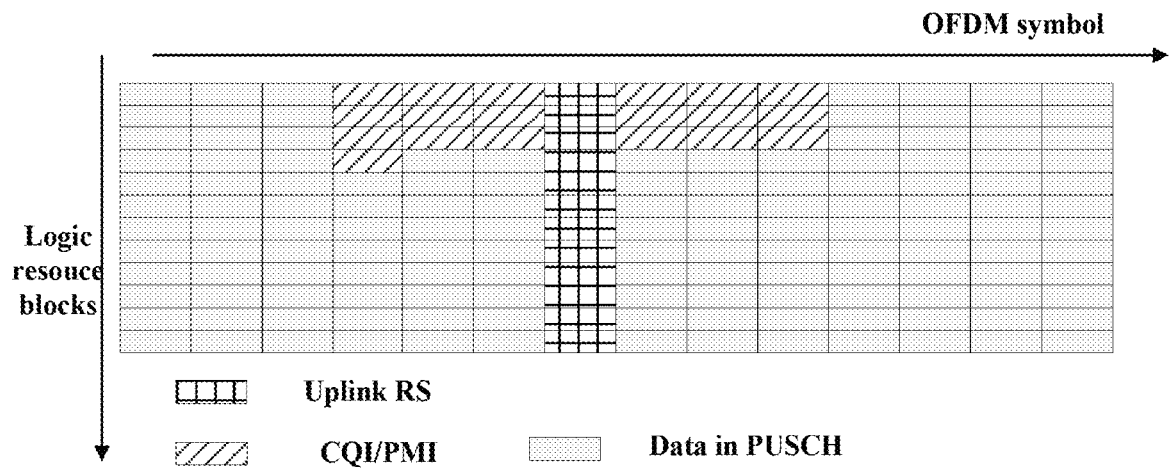
FIG. 7 is still another schematic diagram of multiplexing UCI and a PUSCH within an uplink bandwidth of an embodiment of the present disclosure.

FIG. 7 is still another schematic diagram of multiplexing UCI and a PUSCH within an uplink bandwidth of an embodiment of the present disclosure. As shown in FIG. 7, the uplink reference signal exists only in the first time slot, and is located in the seventh OFDM symbol of the first time slot. The CQI/PMI information is only mapped on 6 OFDM symbols around the uplink reference signal, that is, the fourth to the sixth OFDM symbols of the first time slot and the first to the third OFDM symbols of the second time slot. The mapping is performed following the principle of time domain first, and starts from the first RB of the PUSCH to the RBs of larger serial numbers, which may be followed by uplink data. A mapping relationship of the CQI/PMI is given in FIG. 7 only, for the sake of simplicity.

In another implementation, the subframe where the UCI is located contains one uplink reference signal, and the mapping the UCI onto time-frequency resources by UE includes: mapping ACK/NACK feedback information in a hybrid repeat mechanism onto OFDM symbols close to the uplink reference signal in a manner of frequency domain first.

Furthermore, the CQI or the PMI may be mapped onto all OFDM symbols of a subframe according to the relevant art in a manner of time domain first. In mapping the ACK/NACK feedback information in the hybrid repeat mechanism, the resources for mapping the CQI or the PMI may be skipped over; or in mapping the CQI or the PMI, the resources for mapping the ACK/NACK feedback information in the hybrid repeat mechanism may be skipped over; or in mapping the ACK/NACK feedback information in the hybrid repeat mechanism, the CQI or the PMI may be punctured, and then the ACK/NACK feedback information is mapped onto the resources.

While for the mapping of the RI information, assumed OFDM symbols needing to be occupied by the ACK/NACK feedback information may be calculated first, and then the RI information is started to be mapped on OFDM symbols close to the ACK/NACK feedback information according to the assumed OFDM symbols needing to be occupied by the ACK/NACK feedback information. Or, assumed OFDM symbols and subcarriers needing to be occupied by the ACK/NACK feedback information may be calculated first, and then the RI information is started to be mapped on OFDM symbols where the ACK/NACK feedback information exists and on subcarriers neighboring the subcarriers needing to be occupied by the ACK/NACK feedback information according to the assumed OFDM symbols and subcarriers needing to be occupied by the ACK/NACK feedback information.

In particular, both the ACK/NACK information and the RI information may be mapped following a principle of being close to an uplink reference signal as possible; for example, a priority of the ACK/NACK information is higher, that is, it is ensured that the ACK/NACK information is more close to the uplink reference signal, and the RI information is mapped on an OFDM symbol in close proximity to the OFDM symbols occupied by the ACK/NACK information. Both the ACK/NACK and the RI are mapped in an order of frequency domain first, that is, they are mapped onto the PUSCH in a manner of mapping along serial numbers of the subcarriers first and then along serial numbers of the OFDM symbols. For example, the ACK/NACK information occupies at most M OFDM symbols, and the RI information occupies at most N OFDM symbols. These two types of UCI are mapped from a bottom of a PUSCH bandwidth to a top. While a manner of mapping the CQI/PMI information is identical to that of an existing system, that is, all OFDM symbols of a subframe are occupied in the time domain, and mapping is performed from a top of band resources occupied by the PUSCH to a bottom, which may be followed by uplink data.

For example, in order to avoid that the ACK/NACK information is mapped onto resources of the CQI/PMI information and punctures the CQI/PMI information, it may be provided that these resources (such as REs) are skipped over when the ACK/NACK information is mapped, or it may be provided that resources for transmitting the ACK/NACK information are skipped over when the CQI/PMI information is mapped.

For example, in determining the OFDM symbols onto which the RI information may be mapped, the OFDM symbols needing to be occupied by the ACK/NACK information may be calculated according to a predefined assumption, and the RI information may be mapped onto the OFDM symbols in close proximity to the ACK/NACK information.

For example, the RI information may be mapped onto the same OFDM symbol as the ACK/NACK information. According to the above rules, the ACK/NACK information is mapped preferentially, followed by the RI information, that is, the mapping of the RI information may be started from remaining subcarriers of the same OFDM symbol, and if a resource of the symbol is insufficient to carry the RI information, it may be continued to be mapped onto an OFDM symbol close to the OFDM symbol or in proximity to an uplink reference signal as possible. In determining serial numbers of the OFDM symbols and serial numbers of the subcarriers onto which the RI information may be mapped, the OFDM symbols and the subcarriers needing to be occupied by the ACK/NACK information may be calculated according to a predefined assumption, and the RI information may be mapped onto subcarriers neighboring the subcarriers of the ACK/NACK information in the same OFDM symbol.

For example, the maximum number of the OFDM symbols occupied by the ACK/NACK may be configured via a high layer.

Figure 8:
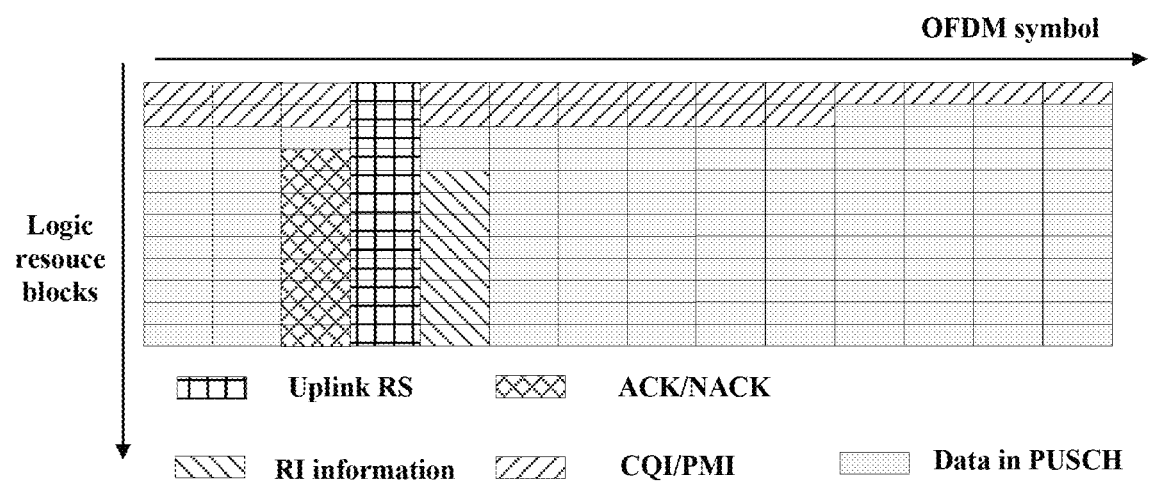
FIG. 8 is yet another schematic diagram of multiplexing UCI and a PUSCH within an uplink bandwidth of an embodiment of the present disclosure.
Figure 9:
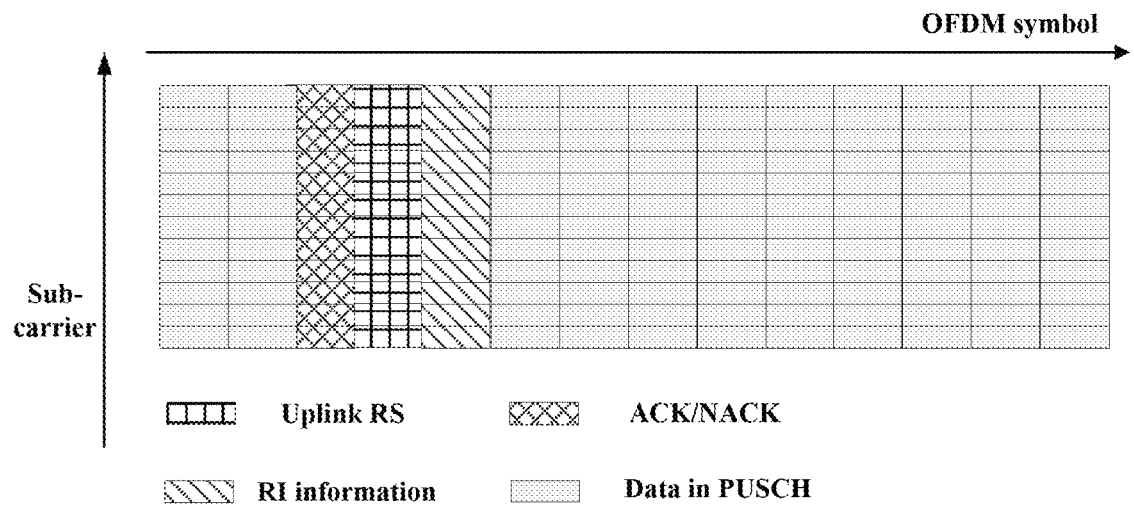
FIG. 9 is still another schematic diagram of multiplexing UCI and a PUSCH within a logic resource block pair of an embodiment of the present disclosure.

FIG. 8 is yet another schematic diagram of multiplexing UCI and a PUSCH within an uplink bandwidth of an embodiment of the present disclosure, and FIG. 9 is still another schematic diagram of multiplexing UCI and a PUSCH within a logic resource block pair of an embodiment of the present disclosure. As shown in FIGS. 8 and 9, the uplink reference signal exists only in a time slot, and is located at a fourth OFDM symbol of a first time slot. The ACK/NACK information is transmitted on OFDM symbols in close proximity to the uplink reference signal. In this example, both the ACK/NACK information and RI information occupy one OFDM symbol, respectively. For example, the ACK/NACK occupies a third OFDM symbol of the first time slot, and the RI occupies the fifth OFDM symbol of the first time slot.

As shown in FIG. 8, both two types of UCI information are mapped following the rule of frequency domain first. In this example, it is assumed that the PUSCH is allocated with 12 RB pairs. Both the ACK/NACK information and the RI information are mapped to RBs of smaller serial numbers starting from a twelfth RB of the PUSCH. And a manner of mapping the CQI/PMI is identical to that of an existing system, that is, all 14 OFDM symbols of a subframe are occupied in the time domain, and mapping is performed starting from a first RB of the PUSCH to RBs of larger serial numbers, which may be followed by uplink data. The number and serial numbers of the OFDM symbols occupied by the ACK/NACK may be predefined by the system, may be configured via a high layer, or may be calculated based on an assumption according to a predefined rule.

Figure 10:
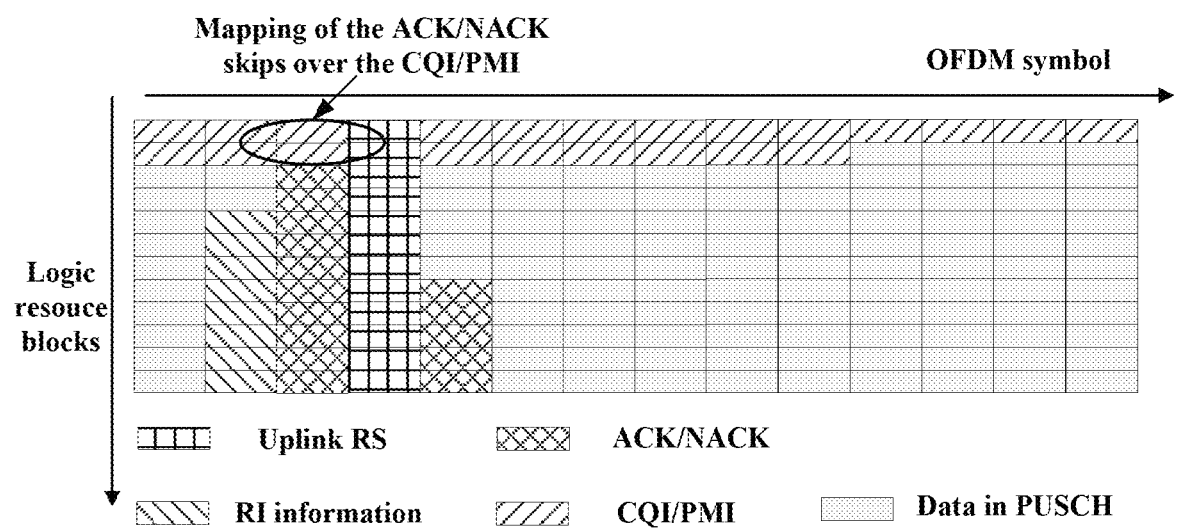
FIG. 10 is still another schematic diagram of multiplexing UCI and a PUSCH within an uplink bandwidth of an embodiment of the present disclosure.

FIG. 10 is still another schematic diagram of multiplexing UCI and a PUSCH within an uplink bandwidth of an embodiment of the present disclosure. As shown in FIG. 10, the ACK/NACK information occupies two OFDM symbols, and the RI information occupies one OFDM symbol; for example the ACK/NACK information occupies OFDM symbols in close proximity to an uplink reference signal, that is, the third and fifth OFDM symbols of the first time slot, and the RI information occupies the second OFDM symbol of the first time slot. As shown in FIG. 10, when resources of the ACK/NACK information possibly collide with the CQI/PMI information, the resources may be skipped over, and the mapping is continued.

Figure 11:
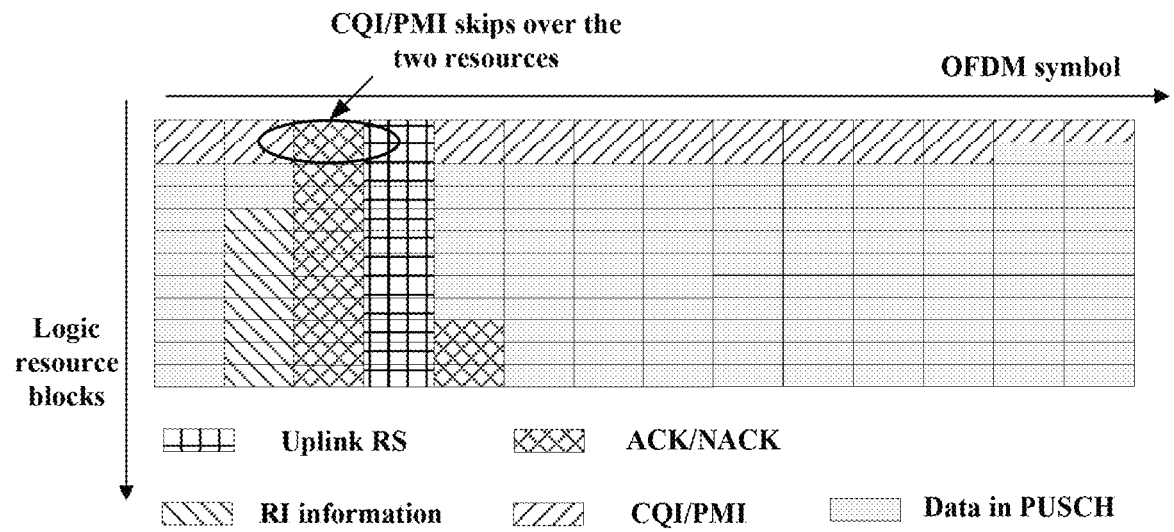
FIG. 11 is still another schematic diagram of multiplexing UCI and a PUSCH within an uplink bandwidth of an embodiment of the present disclosure.

FIG. 11 is still another schematic diagram of multiplexing UCI and a PUSCH within an uplink bandwidth of an embodiment of the present disclosure. As shown in FIG. 11, the resources possibly occupied by the ACK/NACK information may be skipped over in mapping the CQI/PMI, and the ACK/NACK information may be mapped onto them. Of course, the mapping of the CQI/PMI may be unchanged, and when collision occurs, the CQI/PMI information may be punctured, and the ACK/NACK information may be mapped onto them. This is identical to that of the relevant art, and a schematic diagram of it is not given.

In this implementation, where FIGS. 8-11 are contained, the resources mapped by the RI information need to be based on an assumption of the resources possibly occupied by the ACK/NACK, and it is determined following a principle of being close to a position of an uplink reference signal as possible. The assumed OFDM symbols and the subcarriers needing to be occupied by the ACK/NACK feedback information may be calculated according to the following information, such as the number of transport blocks (TBs) of the ACK/NACK possibly needing to be fed back, the number of carriers (CCs) with which a base station and a user may be configured, the number of configured antenna ports, the number of TBs that can be scheduled by each downlink subframe, the number of downlink subframes needing to be fed back simultaneously by a TDD system, and a difference between control information and a data information modulation coding rate, etc.

It should be noted that an assumed payload of the ACK/NACK is possibly inconsistent with an actual payload. For example, the assumed payload of the ACK/NACK is a possible maximum payload under certain system configuration, and the actual payload is less than or equal to this value.

For example, the maximum number of the OFDM symbols occupied by the ACK/NACK may be configured via a high layer.

Figure 12:
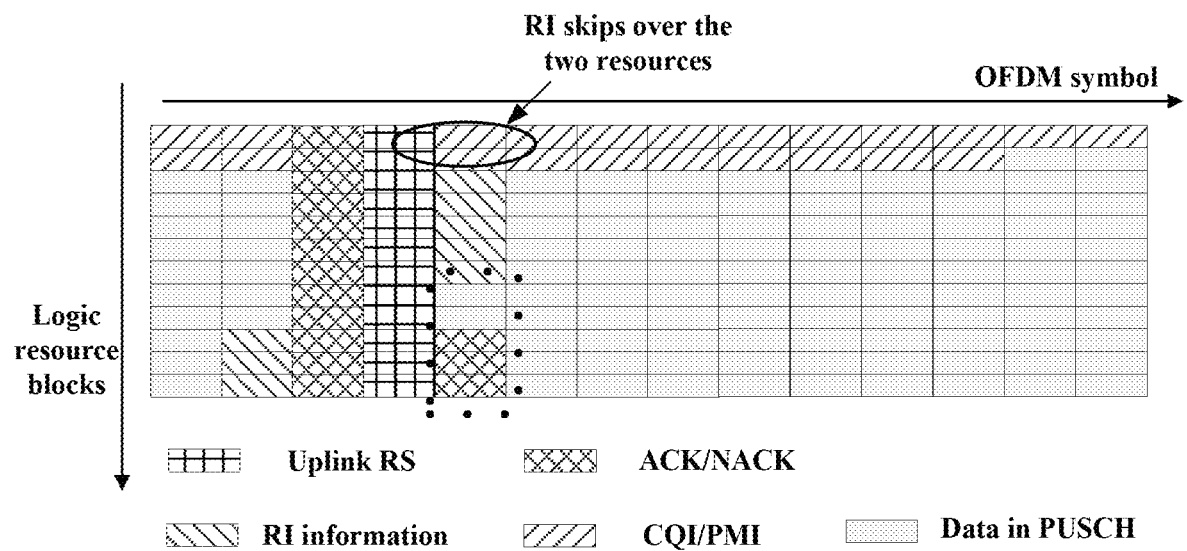
FIG. 12 is still another schematic diagram of multiplexing UCI and a PUSCH within an uplink bandwidth of an embodiment of the present disclosure.

FIG. 12 is still another schematic diagram of multiplexing UCI and a PUSCH within an uplink bandwidth of an embodiment of the present disclosure. As shown in FIG. 12, the RI information and the ACK/NACK information may be multiplexed within an OFDM symbol. The ACK/NACK information may be mapped first, with a principle being identical that described above in this implementation. What is different is that if it is assumed that the ACK/NACK information does not occupy the OFDM symbol completely, the RI information may follow it.

In this example, the RI information is first mapped onto the OFDM symbol not completely occupied by the ACK/NACK information, i.e. the fifth OFDM symbol of the first time slot, and then mapped onto the second OFDM symbol of the first time slot following the principle of being closest to an uplink reference signal. It should be noted that the mapping of the RI information should not collide with the CQI/PMI, that is, this resource is skipped over, and the mapping is continued. Furthermore, as shown in FIG. 12, the part in dotted lines is the assumed resources occupied by the ACK/NACK, but actually they are not completely occupied, while the RI information must still be mapped starting from a first subcarrier outside of the frame in dotted lines.

In another implementation, the subframe where the UCI is located contains one uplink reference signal, and the mapping the UCI onto time-frequency resources by UE includes: mapping the ACK/NACK feedback information in a hybrid repeat mechanism onto OFDM symbols close to UCI in a manner of frequency domain first.

Furthermore, the CQI or the PMI may be mapped onto OFDM symbols of the time slot where the uplink reference signal is located in a manner of time domain first, or the CQI or the PMI may be mapped onto K OFDM symbols close to the uplink reference signal; where, K is greater than or equal to 1, and is less than the number of OFDM symbols contained in one subframe. In mapping the ACK/NACK feedback information in the hybrid repeat mechanism, the resources for mapping the CQI or the PMI may be skipped over; or in mapping the CQI or the PMI, the resources for mapping the ACK/NACK feedback information in the hybrid repeat mechanism may be skipped over.

While for the mapping of the RI information, assumed OFDM symbols needing to be occupied by the ACK/NACK feedback information may be calculated first, and then the RI information is started to be mapped on OFDM symbols close to the ACK/NACK feedback information according to the assumed OFDM symbols needing to be occupied by the ACK/NACK feedback information. Or, assumed OFDM symbols and subcarriers needing to be occupied by the ACK/NACK feedback information may be calculated first, and then the RI information is started to be mapped on OFDM symbols where the ACK/NACK feedback information exists and on subcarriers neighboring the subcarriers needing to be occupied by the ACK/NACK feedback information according to the assumed OFDM symbols and subcarriers needing to be occupied by the ACK/NACK feedback information.

In particular, both the ACK/NACK information and the RI information may be mapped following a principle of being close to an uplink reference signal as possible; for example, a priority of the ACK/NACK information is higher, that is, it is ensured that the ACK/NACK information is more close to the uplink reference signal, and the RI information is mapped on an OFDM symbol in close proximity to the OFDM symbols occupied by the ACK/NACK information. All the UCI is mapped in an order of frequency domain first, that is, it is mapped onto the PUSCH in a manner of mapping along serial numbers of the subcarriers first and then along serial numbers of the OFDM symbols. For example, the ACK/NACK information occupies at most M OFDM symbols, and the RI information occupies at most N OFDM symbols. These two types of UCI are mapped from a bottom of a PUSCH bandwidth to a top. While the CQI/PMI information is only mapped within a time slot containing an uplink reference signal, or is mapped within a distance of k OFDM symbols from the uplink reference signal. The CQI/PMI information is mapped from the top of the PUSCH bandwidth to the bottom in an order of time domain first, which may be followed by uplink data.

For example, in order to avoid that the ACK/NACK information is mapped onto resources of the CQI/PMI information and punctures the CQI/PMI information, it may be provided that these resources (such as REs) are skipped over when the ACK/NACK information is mapped, or it may be provided that resources for transmitting the ACK/NACK information are skipped over when the CQI/PMI information is mapped.

For example, in determining the OFDM symbols onto which the RI information may be mapped, the OFDM symbols needing to be occupied by the ACK/NACK information may be calculated according to a predefined assumption, and the RI information may be mapped onto the OFDM symbols in close proximity to the ACK/NACK information.

For example, the RI information may be mapped onto the same OFDM symbol as the ACK/NACK information. According to the above rules, the ACK/NACK information is mapped preferentially, followed by the RI information, that is, the mapping of the RI information may be started from remaining subcarriers of the same OFDM symbol, and if a resource of the symbol is insufficient to carry the RI information, it may be continued to be mapped onto an OFDM symbol close to the OFDM symbol or in proximity to an uplink reference signal as possible. In determining serial numbers of the OFDM symbols and serial numbers of the subcarriers onto which the RI information may be mapped, the OFDM symbols and the subcarriers needing to be occupied by the ACK/NACK information may be calculated according to a predefined assumption, and the RI information may be mapped onto subcarriers neighboring the subcarriers of the ACK/NACK information in the same OFDM symbol.

Figure 13:
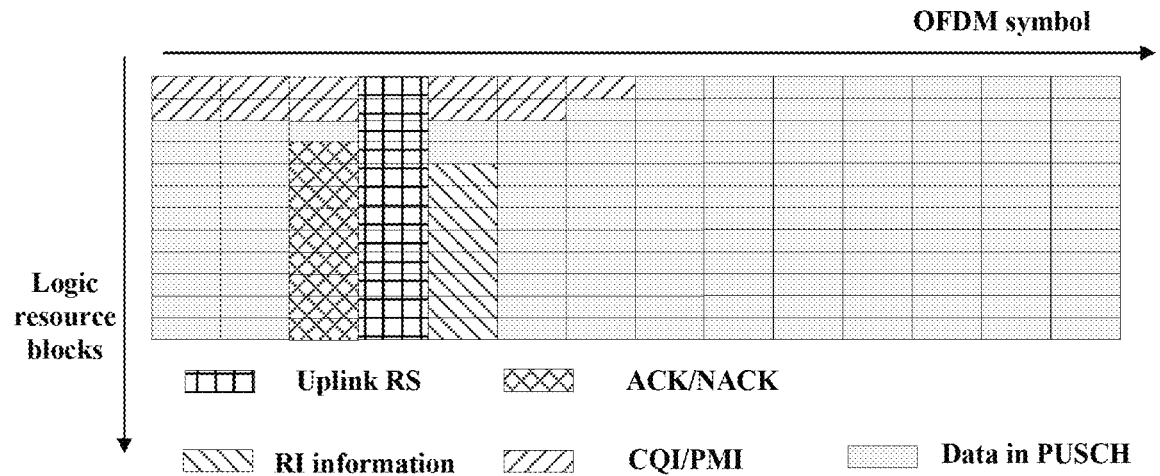
FIG. 13 is still another schematic diagram of multiplexing UCI and a PUSCH within an uplink bandwidth of an embodiment of the present disclosure.

FIG. 13 is still another schematic diagram of multiplexing UCI and a PUSCH within an uplink bandwidth of an embodiment of the present disclosure. As shown in FIG. 13, the uplink reference signal exists only in a time slot, and is located at a fourth OFDM symbol of a first time slot. The ACK/NACK information is transmitted on OFDM symbols in close proximity to the uplink reference signal. In this example, both the ACK/NACK information and RI information occupy one OFDM symbol, respectively. For example, the ACK/NACK occupies the third OFDM symbol of the first time slot, and the RI occupies the fifth OFDM symbol of the first time slot.

As shown in FIG. 13, both two types of UCI information are mapped following the rule of frequency domain first. In this example, it is assumed that the PUSCH is allocated with 12 RB pairs. Both the ACK/NACK information and the RI information are mapped to RBs of smaller serial numbers starting from a twelfth RB of the PUSCH.

As shown in FIG. 13, the CQI/PMI information is only mapped within a time slot containing an uplink reference signal, or is mapped within a distance of k OFDM symbols from the uplink reference signal. The CQI/PMI information is mapped from the top of the PUSCH bandwidth to the bottom in an order of time domain first.

Figure 14:
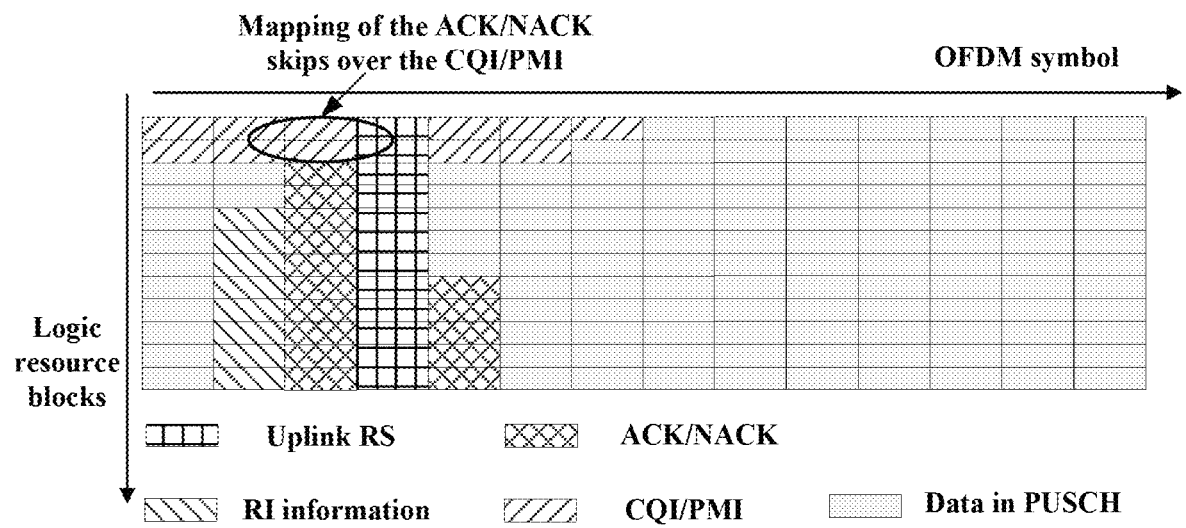
FIG. 14 is still another schematic diagram of multiplexing UCI and a PUSCH within an uplink bandwidth of an embodiment of the present disclosure.

FIG. 14 is still another schematic diagram of multiplexing UCI and a PUSCH within an uplink bandwidth of an embodiment of the present disclosure. As shown in FIG. 14, the ACK/NACK information occupies two OFDM symbols, and the RI information occupies one OFDM symbol; for example the ACK/NACK information occupies OFDM symbols in close proximity to an uplink reference signal, that is, the third and fifth OFDM symbols of the first time slot, and the RI information occupies the second OFDM symbol of the first time slot. As shown in FIG. 14, when resources of the ACK/NACK information possibly collide with the CQI/PMI information, the resources may be skipped over, and the mapping is continued.

Figure 15:
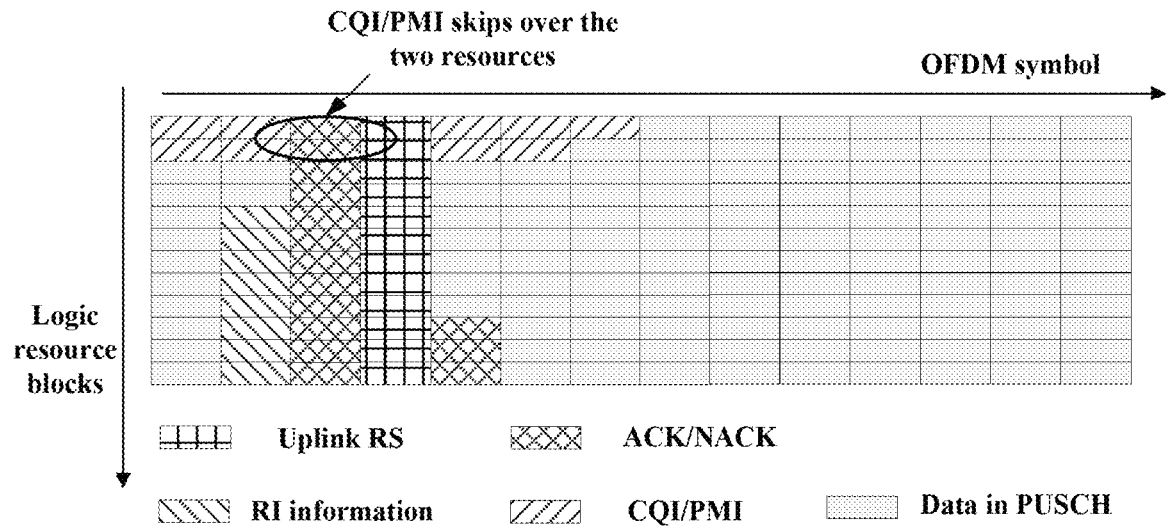
FIG. 15 is still another schematic diagram of multiplexing UCI and a PUSCH within an uplink bandwidth of an embodiment of the present disclosure.

FIG. 15 is still another schematic diagram of multiplexing UCI and a PUSCH within an allocated uplink bandwidth of an embodiment of the present disclosure. As shown in FIG. 15, the resources possibly occupied by the ACK/NACK information may be skipped over in mapping the CQI/PMI, and the ACK/NACK information may be mapped onto them. Of course, the mapping of the CQI/PMI may be unchanged, and when collision occurs, the CQI/PMI information may be punctured, and the ACK/NACK information may be mapped onto them. This is identical to that of the relevant art, and a schematic diagram of it is not given.

In this implementation, the resources mapped by the RI information need to be based on an assumption of the resources possibly occupied by the ACK/NACK, and it is determined following a principle of being close to a position of an uplink reference signal as possible. The assumed OFDM symbols and the subcarriers needing to be occupied by the ACK/NACK feedback information may be calculated according to the following information, such as the number of transport blocks (TBs) of the ACK/NACK possibly needing to be fed back, the number of carriers (CCs) with which a base station and a user may be configured, the number of configured antenna ports, the number of TBs that can be scheduled by each downlink subframe, the number of downlink subframes needing to be fed back simultaneously by a TDD system, and a difference between control information and a data information modulation coding rate, etc.

It should be noted that an assumed payload of the ACK/NACK is possibly inconsistent with an actual payload. For example, the assumed payload of the ACK/NACK is a possible maximum payload under certain system configuration, and the actual payload is less than or equal to this value. For example, the maximum number of the OFDM symbols occupied by the ACK/NACK may be configured via a high layer.

Figure 16:
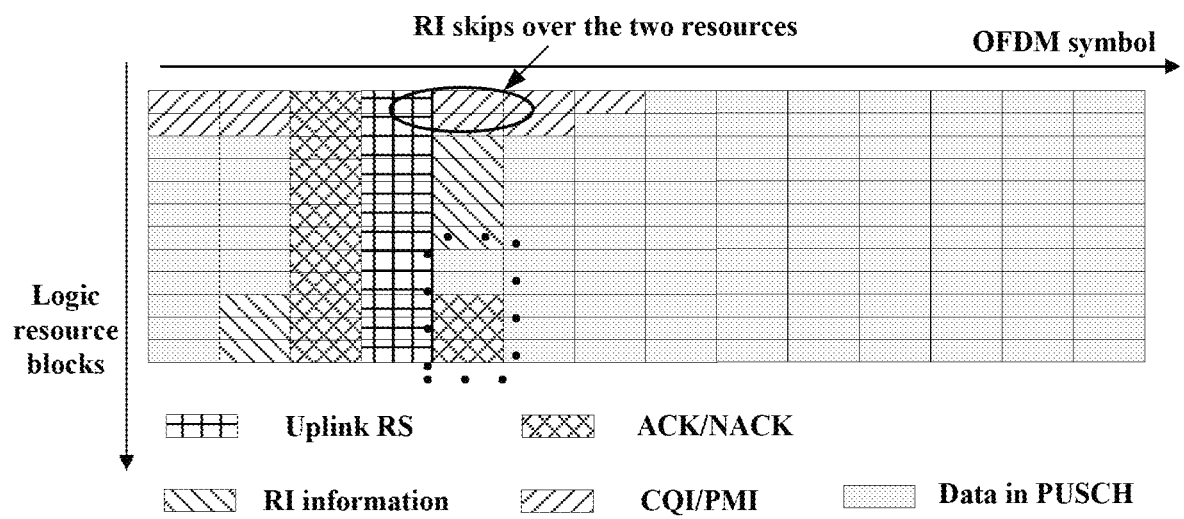
FIG. 16 is still another schematic diagram of multiplexing UCI and a PUSCH within an uplink bandwidth of an embodiment of the present disclosure.

FIG. 16 is still another schematic diagram of multiplexing UCI and a PUSCH within an allocated uplink bandwidth of an embodiment of the present disclosure. As shown in FIG. 16, the RI information and the ACK/NACK information may be multiplexed within an OFDM symbol. The ACK/NACK information may be mapped first, with a principle being identical that described above in this implementation. What is different is that if it is assumed that the ACK/NACK information does not occupy the OFDM symbol completely, the RI information may follow it.

In this example, the RI information is first mapped onto the OFDM symbol occupied by the ACK/NACK information, i.e. the fifth OFDM symbol of the first time slot, and then mapped onto the second OFDM symbol of the first time slot following the principle of being closest to an uplink reference signal. It should be noted that the mapping of the RI information should not collide with the CQI/PMI, that is, this resource is skipped over, and the mapping is continued. Furthermore, as shown in FIG. 16, the part in dotted lines is the assumed resources occupied by the ACK/NACK, but actually they are not completely occupied, while the RI information must still be mapped starting from a first subcarrier outside of the frame in dotted lines.

In another implementation, the subframe where the UCI is located contains one uplink reference signal, and the mapping the UCI onto time-frequency resources by UE includes: mapping the ACK/NACK feedback information in a hybrid repeat mechanism onto OFDM symbols close to UCI in a manner of time domain first. Furthermore, the CQI or the PMI may be mapped onto all OFDM symbols of a subframe according to the relevant art in a mapping manner of time domain first.

While for the mapping of the RI information, the RI information is started to be mapped on OFDM symbols close to the ACK/NACK feedback information according to assumed OFDM symbols needing to be occupied by the ACK/NACK feedback information. Or, the RI information is started to be mapped on OFDM symbols where the ACK/NACK feedback information exists and on subcarriers neighboring the subcarriers needing to be occupied by the ACK/NACK feedback information according to assumed OFDM symbols and subcarriers needing to be occupied by the ACK/NACK feedback information.

In particular, both the ACK/NACK information and the RI information may be mapped following a principle of being close to an uplink reference signal as possible; for example, a priority of the ACK/NACK information is higher, that is, it is ensured that the ACK/NACK information is more close to the uplink reference signal, and the RI information is mapped on an OFDM symbol in close proximity to the OFDM symbols occupied by the ACK/NACK information. All the UCI is mapped in an order of time domain first, that is, it is mapped onto the PUSCH in a manner of mapping along serial numbers of the OFDM symbols first and then along serial numbers of the subcarriers. For example, the ACK/NACK information occupies at most M OFDM symbols, and the RI information occupies at most N OFDM symbols, M and N being configured via a high layer.

For example, M and N are predefined by the system; however, they may have multiple groups of values, but not unique values, that is, multiple groups of values may be defined according to different payloads of the UCI. A base station and UE may determine values of M and N according to assumed payloads. These two types of UCI are mapped from a bottom of a PUSCH bandwidth to a top. And a manner of mapping the CQI/PMI is identical to that of an existing system, that is, occupying all OFDM symbols of a subframe in the time domain, and mapping from tops of frequency band resources occupied by the PUSCH to the bottoms; and uplink data may follow immediately.

For example, the RI information may be mapped onto the one or more same OFDM symbol(s) as the ACK/NACK information. According to the above rules, the ACK/NACK information is mapped preferentially, followed by the RI information, that is, the mapping of the RI information may be started from remaining subcarriers of the same OFDM symbol(s), and if a resource of the symbol(s) is insufficient to carry the RI information, it may be continued to be mapped onto an OFDM symbol close to the OFDM symbol or in proximity to an uplink reference signal as possible. In determining serial numbers of the OFDM symbols and serial numbers of the subcarriers onto which the RI information may be mapped, the OFDM symbols and the subcarriers needing to be occupied by the ACK/NACK information may be calculated according to a predefined assumption, and the RI information may be mapped onto subcarriers neighboring the subcarriers of the ACK/NACK information in the same OFDM symbol.

Figure 17:
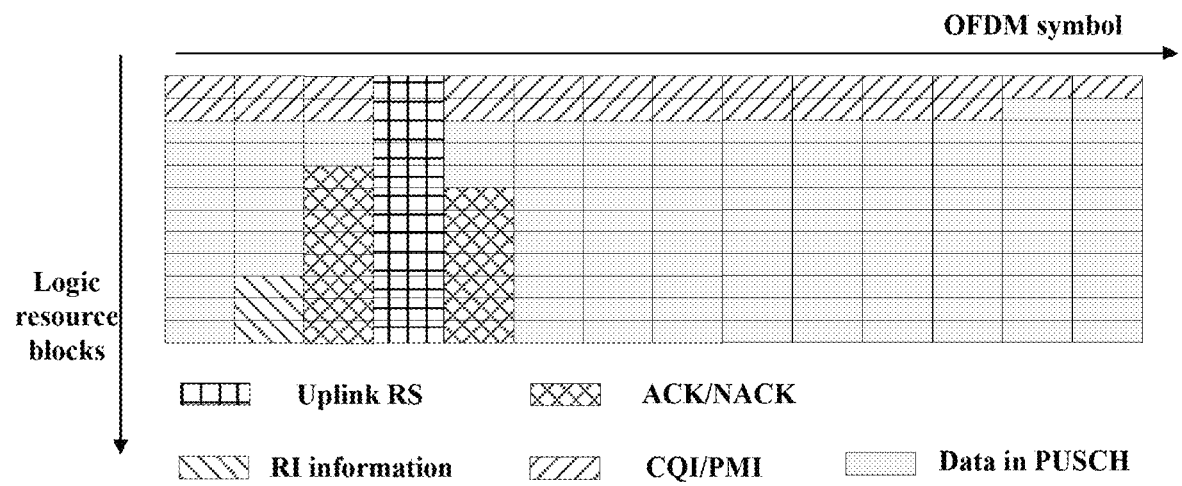
FIG. 17 is still another schematic diagram of multiplexing UCI and a PUSCH within an uplink bandwidth of an embodiment of the present disclosure.

FIG. 17 is still another schematic diagram of multiplexing UCI and a PUSCH within an allocated uplink bandwidth of an embodiment of the present disclosure. As shown in FIG. 17, the uplink reference signal exists only in a time slot, and is located at a fourth OFDM symbol of a first time slot. The ACK/NACK information is transmitted on OFDM symbols in close proximity to the uplink reference signal; for example the number M of the OFDM symbols occupied by the ACK/NACK information and the number N of the OFDM symbols occupied by the RI information are configured by a high layer, and in this example, M=2, and N=1.

Within the configured OFDM symbols, both two types of UCI information are mapped following the rule of time domain first, and from a bottom of the PUSCH bandwidth to a top in the frequency domain. And a manner of mapping the CQI/PMI is identical to that of an existing system, that is, occupying all 14 OFDM symbols of a subframe in the time domain, and mapping from the first RB of the PUSCH to RBs of larger serial numbers; and uplink data may follow immediately.

Figure 18:
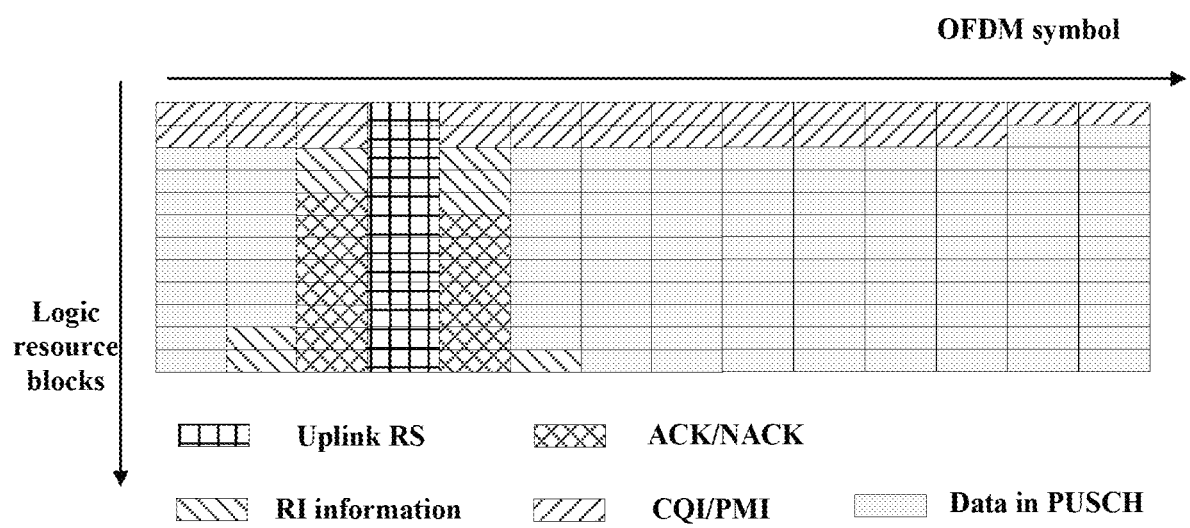
FIG. 18 is still another schematic diagram of multiplexing UCI and a PUSCH within an uplink bandwidth of an embodiment of the present disclosure.

FIG. 18 is still another schematic diagram of multiplexing UCI and a PUSCH within an allocated uplink bandwidth of an embodiment of the present disclosure. As shown in FIG. 18, the ACK/NACK information may also be multiplexed with the RI information within one or more OFDM symbol(s). For example, the ACK/NACK information is mapped first, followed by mapping of the RI information. And it is assumed that M=2 and N=4 configured via a high layer, then the RI information is mapped on the second and sixth OFDM symbols of the first time slot after being mapped on the third and the fifth OFDM symbols of the first time slot. The OFDM symbols multiplexed with the ACK/NACK information are mapped preferentially, and then mapping is performed on new OFDM symbols, following the principle of being most close to an uplink reference signal. As shown in FIG. 18, the mapping is performed within the third and the fifth OFDM symbols in the first time slot in an order of time domain first, and within the second and the sixth OFDM symbols in the first time slot in an order of time domain first, respectively.

It should be noted that in this implementation, in mapping of the RI information, the mapping needs to be performed based on assumed ACK/NACK resources.

In another implementation, the subframe where the UCI is located contains one uplink reference signal, and the mapping the UCI onto time-frequency resources by UE includes: mapping the ACK/NACK feedback information in a hybrid repeat mechanism onto OFDM symbols close to an uplink reference signal in a manner of time domain first. Furthermore, the CQI or the PMI may be mapped onto OFDM symbols of the time slot where the uplink reference signal is located in a manner of time domain first, or the CQI or the PMI may be mapped onto K OFDM symbols close to the uplink reference signal; where, K is greater than or equal to 1, and is less than the number of OFDM symbols contained in one subframe.

While for the mapping of the RI information, the RI information is started to be mapped on OFDM symbols close to the ACK/NACK feedback information according to assumed OFDM symbols needing to be occupied by the ACK/NACK feedback information. Or, the RI information is started to be mapped on OFDM symbols where the ACK/NACK feedback information exists and on subcarriers neighboring the subcarriers needing to be occupied by the ACK/NACK feedback information according to assumed OFDM symbols and subcarriers needing to be occupied by the ACK/NACK feedback information.

In particular, both the ACK/NACK information and the RI information may be mapped following a principle of being close to an uplink reference signal as possible; for example, a priority of the ACK/NACK information is higher, that is, it is ensured that the ACK/NACK information is more close to the uplink reference signal, and the RI information is mapped on an OFDM symbol in close proximity to the OFDM symbols occupied by the ACK/NACK information. All the UCI is mapped in an order of time domain first, that is, it is mapped onto the PUSCH in a manner of mapping along serial numbers of the OFDM symbols first and then along serial numbers of the subcarriers. For example, the ACK/NACK information occupies at most M OFDM symbols, and the RI information occupies at most N OFDM symbols, M and N being configured via a high layer.

For example, M and N are predefined by the system; however, they may have multiple groups of values, but not unique values, that is, multiple groups of values may be defined according to different payloads of the UCI. A base station and a user may determine values of M and N according to assumed payloads. These two types of UCI are mapped from a bottom of a PUSCH bandwidth to a top. And as to a manner of mapping the CQI/PMI, the CQI or the PMI may be mapped onto OFDM symbols of the time slot where the uplink reference signal is located, or the CQI or the PMI may be mapped onto K OFDM symbols close to the uplink reference signal; where, K is greater than or equal to 1, and is less than the number of OFDM symbols contained in one subframe.

For example, the RI information may be mapped onto the one or more same OFDM symbol(s) as the ACK/NACK information. According to the above rules, the ACK/NACK information is mapped preferentially, followed by the RI information, that is, the mapping of the RI information may be started from remaining subcarriers of the same OFDM symbol(s), and if resources of the symbol(s) are insufficient to carry the RI information, it may be continued to be mapped onto an OFDM symbol close to the OFDM symbols or in proximity to an uplink reference signal as possible. In determining serial numbers of the OFDM symbols and serial numbers of the subcarriers onto which the RI information may be mapped, the OFDM symbols and the subcarriers needing to be occupied by the ACK/NACK information may be calculated according to a predefined assumption, and the RI information may be mapped onto subcarriers neighboring the subcarriers of ACK/NACK information in the same OFDM symbol.

Figure 19:
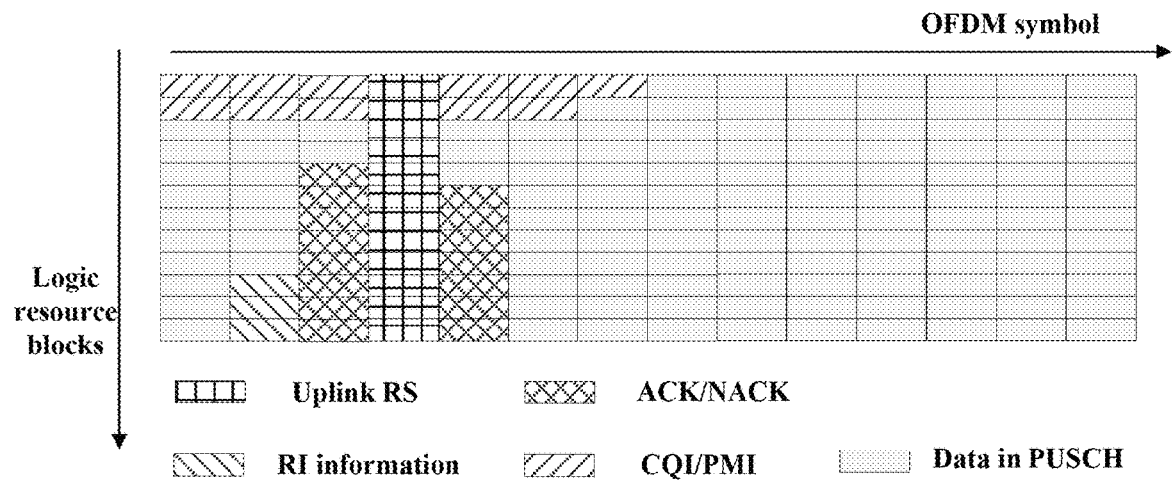
FIG. 19 is still another schematic diagram of multiplexing UCI and a PUSCH within an uplink bandwidth of an embodiment of the present disclosure.

FIG. 19 is still another schematic diagram of multiplexing UCI and a PUSCH within an allocated uplink bandwidth of an embodiment of the present disclosure. As shown in FIG. 19, the uplink reference signal exists only in a time slot, and is located at a fourth OFDM symbol of a first time slot. The ACK/NACK information is transmitted on OFDM symbols in close proximity to the uplink reference signal; for example the number M of the OFDM symbols occupied by the ACK/NACK information and the number N of the OFDM symbols occupied by the RI information are configured by a high layer, and in this example, M=2, and N=1.

Within the configured OFDM symbols, both two types of UCI information are mapped following the rule of time domain first, and from a bottom of the PUSCH bandwidth to a top in the frequency domain. And the CQI or the PMI may be mapped onto OFDM symbols of the time slot where the uplink reference signal is located, or the CQI or the PMI may be mapped onto K OFDM symbols close to the uplink reference signal; where, K is greater than or equal to 1, and is less than the number of OFDM symbols contained in one subframe.

Figure 20:
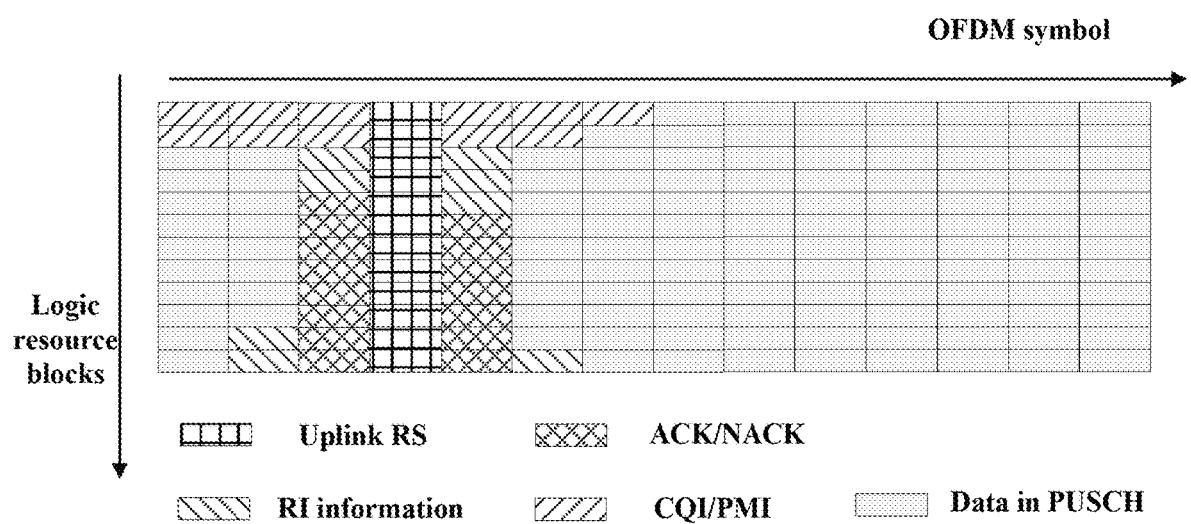
FIG. 20 is still another schematic diagram of multiplexing UCI and a PUSCH within an uplink bandwidth of an embodiment of the present disclosure.

FIG. 20 is still another schematic diagram of multiplexing UCI and a PUSCH within an allocated uplink bandwidth of an embodiment of the present disclosure. As shown in FIG. 20, the ACK/NACK information may also be multiplexed with the RI information within one or more OFDM symbol(s). For example, the ACK/NACK information is mapped first, followed by mapping of the RI information. And it is assumed that M=2 and N=4 configured via a high layer, then the RI information is mapped on the second and sixth OFDM symbols of the first time slot after being mapped on the third and the fifth OFDM symbols of the first time slot. The OFDM symbols multiplexed with the ACK/NACK information are mapped preferentially, and then mapping is performed on new OFDM symbols, following the principle of being most close to an uplink reference signal. As shown in FIG. 20, the mapping is performed within the third and the fifth OFDM symbols in the first time slot in an order of time domain first, and within the second and the sixth OFDM symbols in the first time slot in an order of time domain first, respectively.

It should be noted that the above description is given taking that the uplink reference signal in FIGS. 13-16 and 19-20 occupies the fourth OFDM symbol of the first time slot and the CQI/PMI occupy 6 OFDM symbols of the first time slot as an example only. However, the present disclosure is not limited thereto; for example, the CQI/PMI may also be as shown in FIG. 7, etc., and a particular implementation may be determined according to an actual situation.

The above description is given to the case where the subframe where the UCI is located contains one uplink reference signal, and a case where the subframe where the UCI is located contains no an uplink reference signal shall be described below.

In an implementation, the subframe where the UCI is located contains no an uplink reference signal, and the mapping the UCI onto time-frequency resources by UE includes: mapping ACK/NACK feedback information in a hybrid repeat mechanism onto OFDM symbols; for example the OFDM symbols are close to a nearest uplink reference signal located in another subframe.

In this implementation, the method further includes: calculating assumed OFDM symbols needing to be occupied by the ACK/NACK feedback information; and starting to map RI information on the OFDM symbols close to the ACK/NACK feedback information, according to the assumed OFDM symbols needing to be occupied by the ACK/NACK feedback information, and starting to map the CQI or the PMI on OFDM symbols close to the RI information.

In particular, if there exists no an uplink reference signal to be transmitted for demodulation in the subframe where the UCI is located, the UCI transmitted via the PUSCH in the subframe should be mapped onto OFDM symbols in the subframe, the OFDM symbols are most close to a symbol position of a reference signal located in a subframe containing an uplink reference signal.

For example, if the UCI contains the ACK/NACK information, a priority of the information is highest, that is, it is ensured that the ACK/NACK information is more close to an uplink reference signal of another subframe. And if the UCI contains the RI information, the mapping is performed on OFDM symbol(s) in close proximity to the OFDM symbols occupied by the ACK/NACK.

For example, the number of the OFDM symbols occupied by the ACK/NACK may be configured via a high layer, or the number of the OFDM symbols occupied by the ACK/NACK may be calculated according to an assumption of a predefined rule, as described above, or may be predefined by the system.

Figure 21:
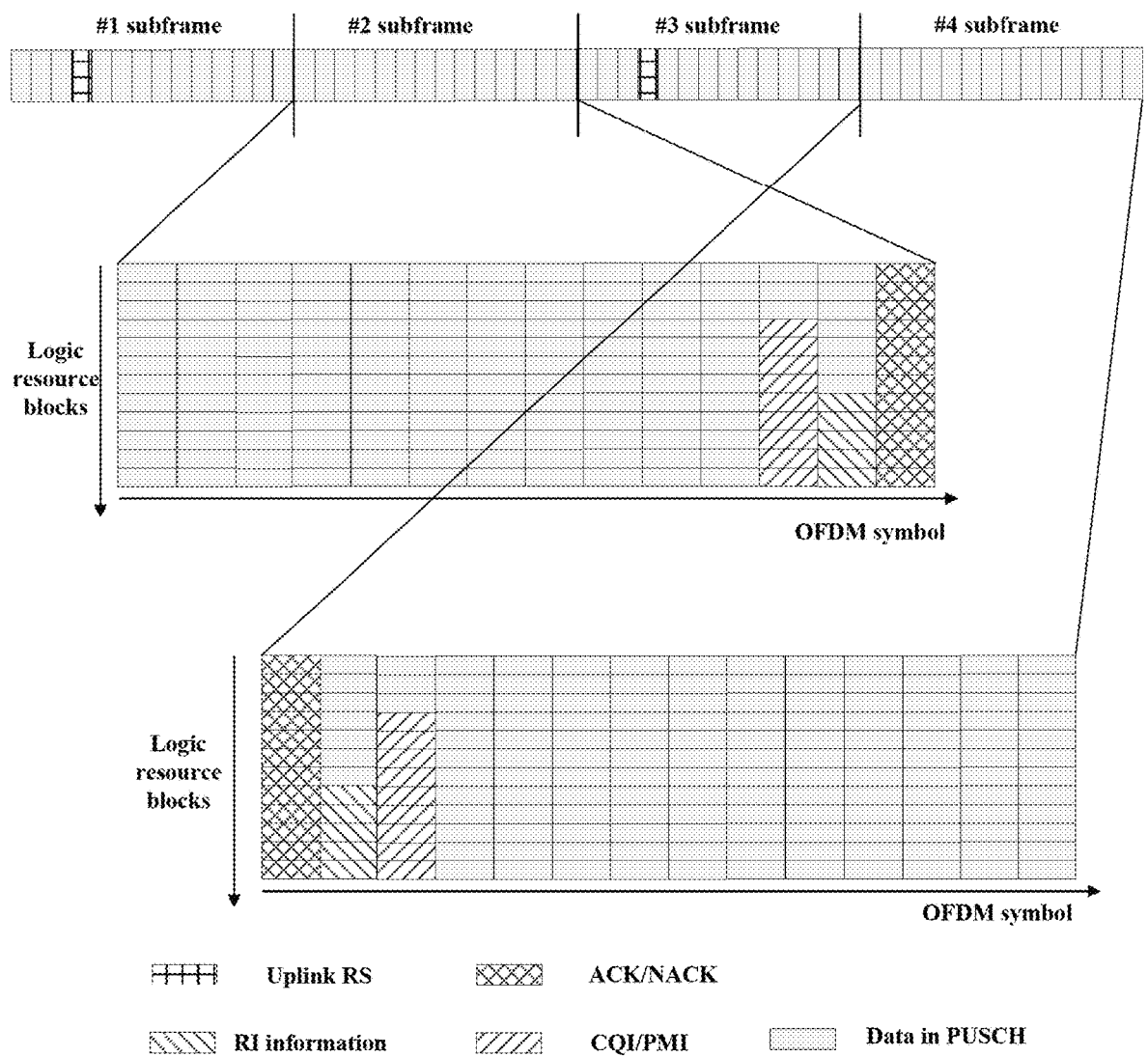
FIG. 21 is still another schematic diagram of multiplexing UCI and a PUSCH within an uplink bandwidth of an embodiment of the present disclosure.

FIG. 21 is still another schematic diagram of multiplexing UCI and a PUSCH within an allocated uplink bandwidth of an embodiment of the present disclosure. As shown in FIG. 21, the uplink subframe where the UCI is located (such as #2 subframe or #4 subframe) contains no an uplink reference signal for demodulation, the first subframe and the third subframe have an uplink reference signal, respectively, and the second subframe and the fourth subframe have no an uplink reference signal, respectively.

As shown in FIG. 21, taking the second subframe as an example, if there exists UCI carried by the PUSCH in the second subframe, the UCI is mapped onto last several OFDM symbols in the subframe as possible, as the several OFDM symbols are more close to an uplink reference signal in the third subframe. For example, the ACK/NACK information is mapped onto the last OFDM symbol, the RI information is mapped onto the last OFDM symbol but one, and the CQI/PMI follows the RI information and is mapped onto the last OFDM symbol but two.

In another implementation, the subframe where the UCI is located contains no an uplink reference signal, and the mapping the UCI onto time-frequency resources by UE includes: mapping ACK/NACK feedback information in a hybrid repeat mechanism onto OFDM symbols in a mapping manner of frequency domain first; for example the OFDM symbols are close to a nearest uplink reference signal located in another subframe.

In this implementation, the method further includes: calculating assumed OFDM symbols and subcarriers needing to be occupied by the ACK/NACK feedback information; and starting to map RI information on the OFDM symbols where the ACK/NACK feedback information exists and the subcarriers neighboring the subcarriers needing to be occupied by the ACK/NACK feedback information, according to assumed OFDM symbols and subcarriers needing to be occupied by the ACK/NACK feedback information, and starting to map the CQI or the PMI on OFDM symbols close to the RI information.

In particular, if there exists no an uplink reference signal to be transmitted for demodulation in the subframe where the UCI is located, the UCI transmitted via the PUSCH in the subframe should be mapped onto OFDM symbols in the subframe, the OFDM symbols are most close to a symbol position of a reference signal located in a subframe containing an uplink reference signal.

For example, if the UCI contains the ACK/NACK information, a priority of the information is highest, that is, it is ensured that the ACK/NACK information is more close to an uplink reference signal of another subframe. And if the UCI contains the RI information, the mapping is performed on OFDM symbol(s) in close proximity to the OFDM symbols occupied by the ACK/NACK.

For example, the number of the OFDM symbols occupied by the ACK/NACK may be configured via a high layer, or the number of the OFDM symbols occupied by the ACK/NACK may be calculated according to an assumption of a predefined rule, or the number of the OFDM symbols occupied by the ACK/NACK may be predefined by the system. The UCI is mapped in an order of frequency domain first, that is, it is mapped onto the PUSCH in a direction of serial numbers of the subcarriers, and then in a direction of serial numbers of the OFDM symbols.

Figure 22:
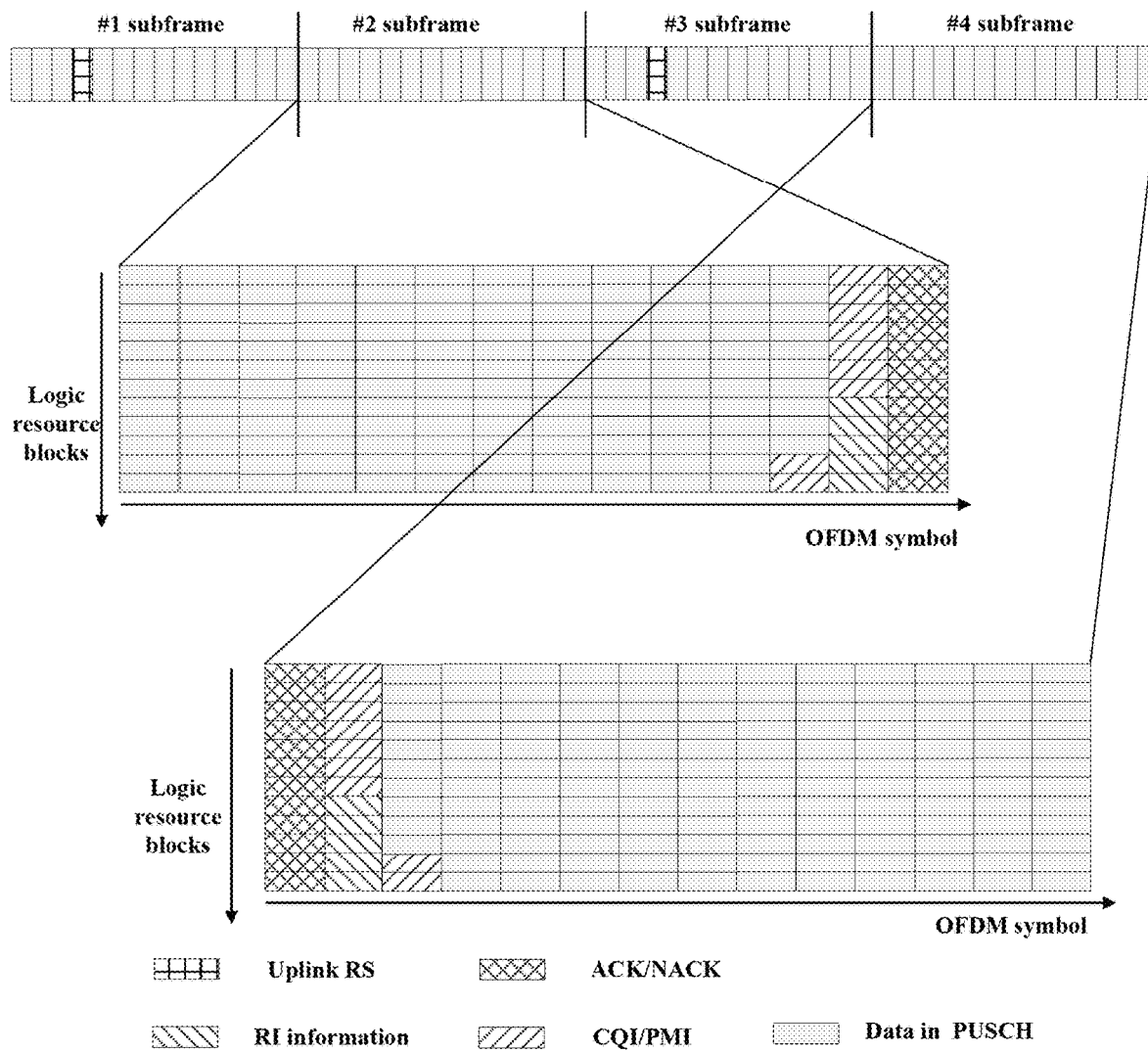
FIG. 22 is still another schematic diagram of multiplexing UCI and a PUSCH within an uplink bandwidth of an embodiment of the present disclosure.

FIG. 22 is still another schematic diagram of multiplexing UCI and a PUSCH within an allocated uplink bandwidth of an embodiment of the present disclosure. As shown in FIG. 22, the uplink subframe where the UCI is located (such as #2 subframe or #4 subframe) contains no an uplink reference signal for demodulation, the first subframe and the third subframe have an uplink reference signal, respectively, and the second subframe and the fourth subframe have no an uplink reference signal, respectively.

As shown in FIG. 22, taking the second subframe as an example, if there exists UCI carried by the PUSCH in the second subframe, the UCI is mapped onto last several OFDM symbols in the subframe as possible, as the several OFDM symbols are more close to an uplink reference signal in the third subframe. All the UCI is mapped in an order of frequency domain first. For example, the ACK/NACK information is mapped onto the last OFDM symbol, according to assumed ACK/NACK information, the RI information starts to be mapped from a neighboring OFDM symbol, and the CQI/PMI follows the RI information, may multiplex the same OFDM symbol as the RI information, or may be mapped onto an OFDM to which the RI information is in close proximity.

In another implementation, the subframe where the UCI is located contains no an uplink reference signal, and the mapping the UCI onto time-frequency resources by UE includes: mapping ACK/NACK feedback information in a hybrid repeat mechanism onto OFDM symbols in a mapping manner of time domain first, the OFDM symbols being close to a nearest uplink reference signal located in another subframe.

In this implementation, the RI information may be mapped onto OFDM symbols close to the ACK/NACK feedback information, and the CQI or the PMI may be mapped onto K OFDM symbols close to the uplink reference signal; where, K is greater than or equal to 1, and is less than the number of OFDM symbols contained in one subframe.

In particular, if there exists no an uplink reference signal to be transmitted for demodulation in the subframe, the UCI transmitted via the PUSCH in the subframe should be mapped onto OFDM symbols in the subframe, the OFDM symbols are most close to a symbol position of a reference signal located in a subframe containing an uplink reference signal.

For example, if the UCI contains the ACK/NACK information, a priority of the information is highest, that is, it is ensured that the ACK/NACK information is more close to an uplink reference signal of another subframe. And if the UCI contains the RI information, the mapping is performed on OFDM symbol(s) in close proximity to the OFDM symbols occupied by the ACK/NACK. The UCI is mapped in an order of time domain first, that is, it is mapped onto the PUSCH in a direction of serial numbers of the OFDM symbols, and then in a direction of serial numbers of the subcarriers.

For example, the number of the OFDM symbols occupied by the ACK/NACK may be configured via a high layer, or the number of the OFDM symbols occupied by the ACK/NACK may be calculated according to an assumption of a predefined rule, or the number of the OFDM symbols occupied by the ACK/NACK may be predefined by the system. And if the UCI contains the CQI/PMI information, the CQI/PMI starts to be mapped from a top of PUSCH frequency domain resources within a distance of k OFDM symbols from a symbol position of an uplink reference signal located in a subframes containing uplink reference signal in an order of time domain first.

Figure 23:
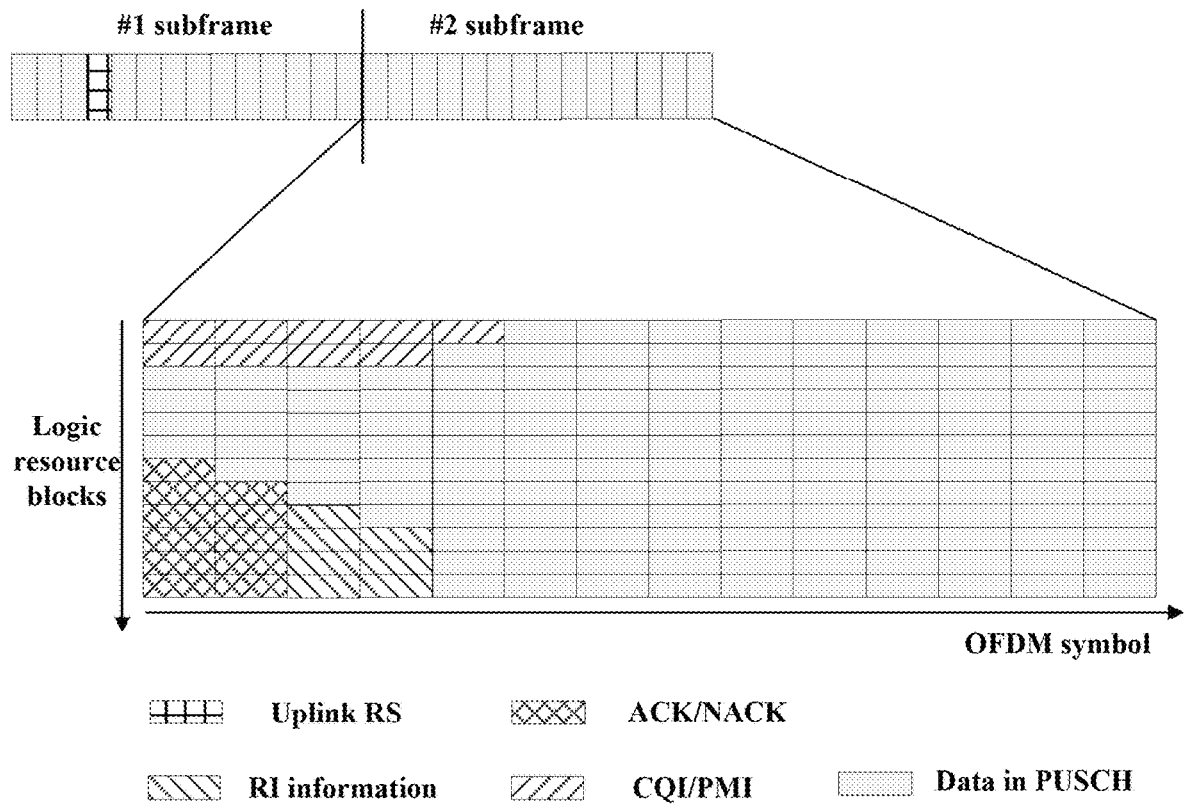
FIG. 23 is still another schematic diagram of multiplexing UCI and a PUSCH within an uplink bandwidth of an embodiment of the present disclosure.

FIG. 23 is still another schematic diagram of multiplexing UCI and a PUSCH within an allocated uplink bandwidth of an embodiment of the present disclosure. As shown in FIG. 23, the uplink subframe where the UCI is located (such as #2 subframe) contains no an uplink reference signal for demodulation, the first subframe has an uplink reference signal, and the second subframe has no an uplink reference signal.

As shown in FIG. 23, if there exists UCI carried by the PUSCH in the second subframe, the UCI is mapped onto former several OFDM symbols in the subframe as possible. As shown in FIG. 23, the ACK/NACK is mapped onto former M OFDM symbols of the second subframe, where, M=2, the RI information is mapped onto N OFDM symbols following it immediately, where, N=2, the ACK/NACK and the RI being mapped from a bottom of the PUSCH band to the top, and the CQI/PMI is mapped onto former K OFDM symbols of the second subframe, where, K=5.

In another implementation, the subframe where the UCI is located contains no an uplink reference signal, and the mapping the UCI onto time-frequency resources by UE includes: mapping ACK/NACK feedback information in a hybrid repeat mechanism onto OFDM symbols in a mapping manner of time domain first; for example, the OFDM symbols are close to a nearest uplink reference signal located in another subframe.

For example, the number of the OFDM symbols occupied by the ACK/NACK may be configured via a high layer, or the number of the OFDM symbols occupied by the ACK/NACK may be calculated according to an assumption of a predefined rule, or the number of the OFDM symbols occupied by the ACK/NACK may be predefined by the system. And the above-described implementations where one subframe contains only one uplink reference signal may be referred to for a particular implementation.

It should be noted that the present disclosure is only illustrated above. However, the present disclosure is not limited thereto, and modification may be made to it. Correspondingly, when the UCI is transmitted in the PUSCH but there exists no uplink data, corresponding may be performed according to the above-described method, with an only exception that corresponding data are removed. Furthermore, if the uplink subframe is an SRS subframe, that is, it is possible that UE transmits an SRS in the last OFDM symbol of the uplink subframe in the system, multiplexing of the PUSCH, UCI and SRS is performed according to rules of existing systems.

It can be seen from the above embodiment that waste of resources may be lowered by only occupying one or occupying no OFDM/SC-FDMA symbol in one subframe by an uplink reference signal; and resource mapping of the UCI is correspondingly changed, thereby making the UCI be transmitted in a PUSCH, and obtaining better demodulation performance.

Embodiment 2

An embodiment of the present disclosure provides a method for transmitting UCI, which shall be described from a base station side, with contents identical to those in Embodiment 1 being not going to be described any further.

Figure 24:
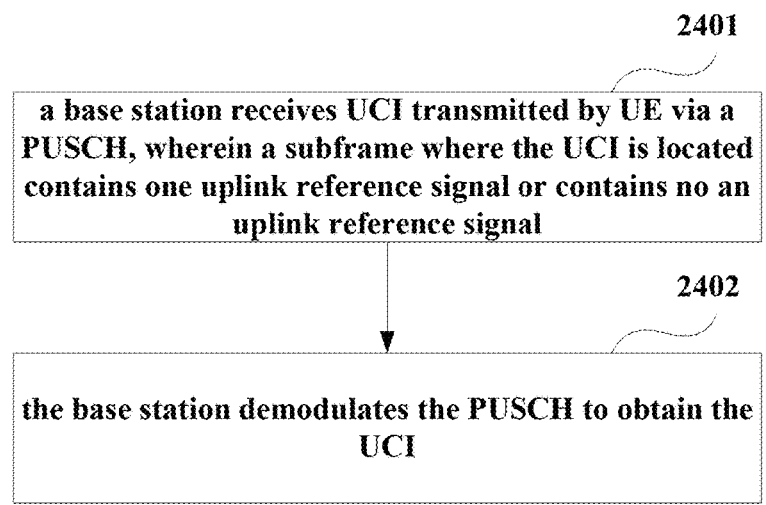
FIG. 24 is another flowchart of the method for transmitting UCI of an embodiment of the present disclosure.

FIG. 24 is a flowchart of the method for transmitting UCI of the embodiment of the present disclosure. As shown in FIG. 24, the method for transmitting includes:

step 2401: a base station receives UCI transmitted by UE via a PUSCH, a subframe where the UCI is located contains one uplink reference signal or contains no an uplink reference signal; and step 2402: the base station demodulates the PUSCH to obtain the UCI.

In this embodiment, the UCI may include first UCI, second UCI and third UCI, which may be divided according to a requirement on performance. However, the present disclosure is not limited thereto. Furthermore, the present disclosure is not limited to three types; for example, it may also be two types or four types, and a particular implementation may be determined according to an actual situation.

For example, the first UCI may be ACK/NACK feedback information in a hybrid repeat mechanism, the second UCI may be RI information, and the third UCI may be CQI or PMI.

In this embodiment, Embodiment 1 may be referred to for the PUSCH and the UCI. And the base station may correspondingly demodulate the PUSCH, and the relevant art may be referred to for how to demodulate.

It can be seen from the above embodiment that waste of resources may be lowered by only occupying one or occupying no OFDM/SC-FDMA symbol in one subframe by an uplink reference signal; and resource mapping of the UCI is correspondingly changed, thereby making the UCI be transmitted in a PUSCH, and obtaining better demodulation performance.

Embodiment 3

An embodiment of the present disclosure provides UE, corresponding to the method for transmitting UCI of Embodiment 1, with contents identical to those in Embodiment 1 being not going to be described any further.

Figure 25:
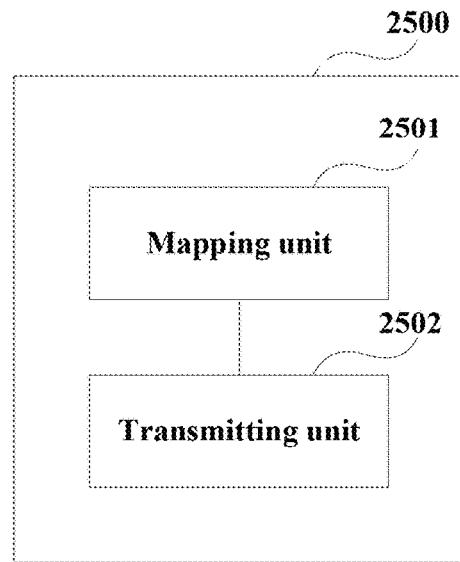
FIG. 25 is a schematic diagram of a structure of the UE of an embodiment of the present disclosure.

FIG. 25 is a schematic diagram of a structure of the UE of an embodiment of the present disclosure. As shown in FIG. 25, the UE 2500 includes: a mapping unit 2501 and a transmitting unit 2502, and the relevant art may be referred to for other parts of the UE 2500.

The mapping unit 2501 is configured to map UCI onto time-frequency resources; a subframe where the UCI is located contains one uplink reference signal or contains no an uplink reference signal; and the transmitting unit 2502 is configured to transmit the UCI to a base station via a PUSCH.

In an implementation, the mapping unit 2501 may be configured to map ACK/NACK feedback information in a hybrid repeat mechanism onto OFDM symbols; when the subframe where the UCI is located contains one uplink reference signal, the OFDM symbols are close to the uplink reference signal, and when the subframe where the UCI is located contains no an uplink reference signal, the OFDM symbols are close to the closest uplink reference signal located on another subframe.

In particular, the mapping unit 2501 may further be configured to map RI information onto OFDM symbols close to the ACK/NACK feedback information.

In particular, the mapping unit 2501 may further be configured to map CQI or PMI onto K OFDM symbols close to the uplink reference signal; where, K is greater than or equal to 1, and is less than the number of OFDM symbols contained in one subframe.

In another implementation, the UE 2500 may further include a first calculating unit configured to calculate assumed OFDM symbols needing to be occupied by the ACK/NACK feedback information; and the mapping unit 2501 is further configured to start to map the RI on the OFDM symbols close to the ACK/NACK feedback information, according to the assumed OFDM symbols needing to be occupied by the ACK/NACK feedback information.

In still another implementation, the UE 2500 may further include a second calculating unit configured to calculate assumed OFDM symbols and subcarriers needing to be occupied by the ACK/NACK feedback information; and the mapping unit 2501 is further configured to start to map the RI on the OFDM symbols where the ACK/NACK feedback information exists and the subcarriers neighboring the subcarriers needing to be occupied by the ACK/NACK feedback information, according to the assumed OFDM symbols and subcarriers needing to be occupied by the ACK/NACK feedback information.

In yet another implementation, the mapping unit 2501 is further configured to map the ACK/NACK feedback information in a hybrid repeat mechanism onto OFDM symbols, in a mapping manner of frequency domain first; when the subframe where the UCI is located contains one uplink reference signal, the OFDM symbols are close to the uplink reference signal, and when the subframe where the UCI is located contains no an uplink reference signal, the OFDM symbols are close to the closest uplink reference signal located on another subframe.

In particular, the mapping unit 2501 may further be configured to map the CQI or PMI onto K OFDM symbols close to the uplink reference signal; where, K is greater than or equal to 1, and is less than the number of OFDM symbols contained in one subframe.

In still another implementation, the UE 2500 may further include a third calculating unit configured to calculate assumed OFDM symbols needing to be occupied by the ACK/NACK feedback information; and the mapping unit 2501 is further configured to start to map the RI on the OFDM symbols close to the ACK/NACK feedback information, according to the assumed OFDM symbols needing to be occupied by the ACK/NACK feedback information.

In still another implementation, the UE 2500 may further include a fourth calculating unit configured to calculate assumed OFDM symbols and subcarriers needing to be occupied by the ACK/NACK feedback information; and the mapping unit 2501 is further configured to start to map the RI on the OFDM symbols where the ACK/NACK feedback information exists and on the subcarriers close to the subcarriers needing to be occupied by the ACK/NACK feedback information, according to the assumed OFDM symbols and subcarriers needing to be occupied by the ACK/NACK feedback information.

In this embodiment, Embodiment 1 may be referred to for the PUSCH, the UCI and how to map the UCI.

It can be seen from the above embodiment that waste of resources may be lowered by only occupying one or occupying no OFDM/SC-FDMA symbol in one subframe by an uplink reference signal; and resource mapping of the UCI is correspondingly changed, thereby making the UCI be transmitted in a PUSCH, and obtaining better demodulation performance.

Embodiment 4

An embodiment of the present disclosure provides a base station, corresponding to the method for transmitting UCI of Embodiment 2, with contents identical to those in Embodiment 2 being not going to be described any further.

Figure 26:
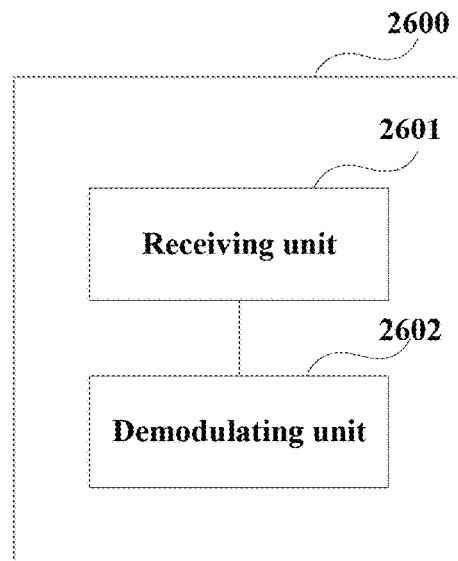
FIG. 26 is a schematic diagram of the base station of an embodiment of the present disclosure.

FIG. 26 is a schematic diagram of a structure of the base station of an embodiment of the present disclosure. As shown in FIG. 26, the base station 2600 includes: a receiving unit 2601 and a demodulating unit 2602, and the relevant art may be referred to for other parts of the base station 2600.

The receiving unit 2601 is configured to receiving UCI transmitted by UE via a PUSCH; a subframe where the UCI is located contains one uplink reference signal or contains no an uplink reference signal; and the demodulating unit 2602 is configured to demodulate the PUSCH to obtain the UCI.

An embodiment of the present disclosure provides a communication system, including the UE as described in Embodiment 3 and the base station as described in Embodiment 4.

Figure 27:
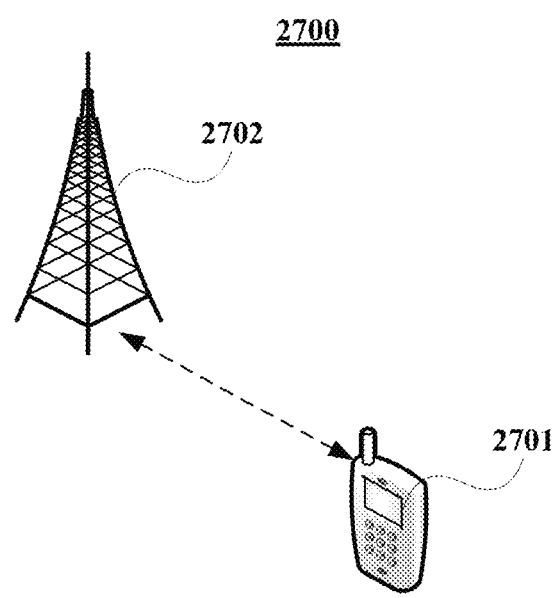
FIG. 27 is a schematic diagram of the communication system of an embodiment of the present disclosure.

FIG. 27 is a schematic diagram of the communication system of the embodiment of the present disclosure. As shown in FIG. 27, the communication system includes the UE 2701 and the base station 2702, and the UE 2701 is configured to transmit UCI to the base station 2702 via a PUSCH.

It can be seen from the above embodiment that waste of resources may be lowered by only occupying one or occupying no OFDM/SC-FDMA symbol in one subframe by an uplink reference signal; and resource mapping of the UCI is correspondingly changed, thereby making the UCI be transmitted in a PUSCH, and obtaining better demodulation performance.

An embodiment of the present disclosure provides a computer-readable program, wherein when the program is executed in UE, the program enables a computer to carry out the method for transmitting UCI as described in Embodiment 1 in the UE.

An embodiment of the present disclosure provides a storage medium in which a computer-readable program is stored, wherein the computer-readable program enables a computer to carry out the method for transmitting UCI as described in Embodiment 1 in UE.

An embodiment of the present disclosure provides a computer-readable program, wherein when the program is executed in a base station, the program enables a computer to carry out the method for transmitting UCI as described in Embodiment 2 in the base station.

An embodiment of the present disclosure provides a storage medium in which a computer-readable program is stored, wherein the computer-readable program enables a computer to carry out the method for transmitting UCI as described in Embodiment 2 in a base station.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

One or more functional blocks and/or one or more combinations of the functional blocks in Figures may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof. And they may also be realized as a combination of computing equipment, such as a combination of a DSP and a microprocessor, multiple processors, one or more microprocessors in communication combination with a DSP, or any other such configuration.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

What is claimed is:
1. A communication apparatus, comprising:
a controller configured to map an uplink control information (UCI) onto a radio resource wherein one time-domain symbol of a subframe where the UCI is located carries an uplink reference signal; and
a transmitter configured to transmit the UCI via a Physical Channel,
wherein the controller is configured to map a first UCI onto Orthogonal Frequency Division Multiplexing (OFDM) symbols in a mapping manner of time domain first,
wherein, when the subframe where the UCI is located contains one uplink reference signal, the OFDM symbols are close to the uplink reference signal, and
wherein the uplink reference signal is carried in a fourth OFDM symbol of the subframe.

2. The communication apparatus according to claim 1, wherein the Physical Channel is a Physical Uplink Shared Channel (PUSCH).

3. The communication apparatus according to claim 2, wherein the first UCI is rank indication (RI) information, a second UCI is channel quality information (CQI) or precoding matrix information (PMI).

4. The communication apparatus according to claim 1, wherein the controller is further configured to map a second UCI onto OFDM symbols close to the first UCI.

5. The communication apparatus according to claim 4, wherein the OFDM symbols needing to be occupied by the first UCI are configured by a high layer, and the OFDM symbols needing to be occupied by the second UCI are configured by a high layer.

6. The communication apparatus according to claim 4, wherein the UCI comprises the first UCI, the second UCI, and a third type of UCI.

7. The communication apparatus according to claim 1, wherein the controller is further configured to calculate assumed OFDM symbols needing to be occupied by the first UCI and start to map a second UCI on the OFDM symbols close to the first UCI, according to the assumed OFDM symbols needing to be occupied by the first UCI.

8. The communication apparatus according to claim 1, wherein the controller is further configured to:
calculate assumed OFDM symbols and subcarriers needing to be occupied by the first UCI; and
start to map
a second UCI on the OFDM symbols where the first UCI exists and
subcarriers neighboring the subcarriers needing to be occupied by the first UCI, according to the assumed OFDM symbols and subcarriers needing to be occupied by the first UCI.

9. The communication apparatus according to claim 1, wherein the OFDM symbols needing to be occupied by a second UCI are configured by a high layer.

10. The communication apparatus according to claim 1, wherein the controller is further configured to map a third type of UCI onto K OFDM symbols close to the uplink reference signal, and
wherein K is greater than or equal to 1 and is less than the number of OFDM symbols contained in one subframe.

11. The communication apparatus according to claim 1, wherein the controller is further configured to map a third UCI onto K OFDM symbols close to the uplink reference signal, and
wherein K is greater than or equal to 1 and is less than the number of OFDM symbols contained in one subframe.

12. The communication apparatus according to claim 1, wherein the controller is further configured to calculate assumed OFDM symbols needing to be occupied by a first type of UCI and start to map a second type of UCI on the OFDM symbols close to the first type of UCI, according to the assumed OFDM symbols needing to be occupied by the first type of UCI.

13. The communication apparatus according to claim 1, wherein the controller is further configured to calculate assumed OFDM symbols and subcarriers needing to be occupied by a first type of UCI; and
start to map a second type of UCI on the OFDM symbols where the first type of UCI exists and on the subcarriers close to the subcarriers needing to be occupied by the first type of UCI, according to the assumed OFDM symbols and subcarriers needing to be occupied by the first type of UCI.

14. The communication apparatus according to claim 1, wherein the subframe comprises 14 Orthogonal Frequency Division Multiplexing (OFDM) symbols or 14 Single-Carrier Frequency Division Multiplexing Access (SC-FDMA) symbols.

15. The communication apparatus according to claim 1, wherein the first UCI is ACK/NACK information.

16. A base station, comprising:
a receiver configured to receive uplink control information (UCI) transmitted by a communication apparatus via a Physical Uplink Shared Channel (PUSCH) wherein one time-domain symbol of a subframe where the UCI is located carries an uplink reference signal; and
a controller configured to demodulate the PUSCH to obtain the UCI wherein a first UCI is mapped onto Orthogonal Frequency Division Multiplexing (OFDM) symbols in a mapping manner of time domain first,
wherein when the subframe where the UCI is located contains one uplink reference signal, the OFDM symbols are close to the uplink reference signal, and
wherein the uplink reference signal is carried in a fourth OFDM symbol of the subframe.

17. A communication system, comprising:
a communication apparatus configured to:
map an uplink control information (UCI) onto a radio resource wherein one time-domain symbol of a subframe where the UCI is located carries an uplink reference signal; and
transmit the UCI via a Physical Uplink Shared Channel (PUSCH), wherein, the controller is configured to map a first UCI onto Orthogonal Frequency Division Multiplexing (OFDM) symbols, in a mapping manner of time domain first, wherein when the subframe where the UCI is located contains one uplink reference signal, the OFDM symbols are close to the uplink reference signal, and wherein the uplink reference signal is carried in a fourth OFDM symbol of the subframe; and
a base station configured to receive the PUSCH and demodulate the PUSCH to obtain the UCI.

* * * * *